United States Patent [19]
Tarumi et al.

[11] Patent Number: 5,631,107
[45] Date of Patent: May 20, 1997

[54] METHOD FOR PRODUCING OPTICAL MEMBER

[75] Inventors: Hiroyuki Tarumi, Kariya; Teiyuu Kimura, Nagoya; Satoshi Koike, Chiryu; Kazumasa Kurokawa, Kariya; Tetsuya Kato, Okazaki; Masayuki Goto, Kariya, all of Japan

[73] Assignee: Nippondenso Co., Ltd., Kariya, Japan

[21] Appl. No.: 711,706

[22] Filed: Aug. 30, 1996

Related U.S. Application Data

[63] Continuation of Ser. No. 391,672, Feb. 17, 1995, abandoned.

[30] Foreign Application Priority Data

Feb. 18, 1994 [JP] Japan ................................. 6-045018
May 17, 1994 [JP] Japan ................................. 6-128261

[51] Int. Cl.$^6$ ................................. G03H 1/04
[52] U.S. Cl. ................. 430/1; 430/2; 430/961; 430/262; 430/256; 430/257; 156/230; 156/235; 156/244.19; 156/244.27; 359/1; 359/3
[58] Field of Search ................. 430/1, 2, 262, 430/256, 257, 961, 945; 156/230, 235, 244.19, 244.27; 359/1, 3, 13, 14

[56] References Cited

U.S. PATENT DOCUMENTS

| | | | |
|---|---|---|---|
| 2,627,088 | 2/1953 | Alles et al. | 430/171 |
| 3,658,526 | 4/1972 | Haugh | 430/1 |
| 4,318,970 | 3/1982 | Kurland et al. | 430/1 |
| 4,751,124 | 6/1988 | Matsuzawa et al. | 430/945 |
| 4,908,285 | 3/1990 | Kushibiki et al. | 430/1 |
| 4,978,593 | 12/1990 | Yin et al. | 430/2 |
| 4,990,415 | 2/1991 | Yu | 430/2 |
| 4,998,784 | 3/1991 | Freeman et al. | 359/14 |
| 5,024,909 | 6/1991 | Smothers et al. | 430/2 |
| 5,066,525 | 11/1991 | Nakamachi et al. | 430/1 |
| 5,172,250 | 12/1992 | Tsuchiya et al. | 359/1 |
| 5,182,180 | 1/1993 | Gambogi, Jr. et al. | 430/2 |
| 5,204,152 | 4/1993 | Yoshizawa | 430/945 |
| 5,276,537 | 1/1994 | Savant et al. | 430/1 |
| 5,313,319 | 5/1994 | Saburi et al. | 359/13 |
| 5,360,501 | 11/1994 | Bolt | 156/101 |

FOREIGN PATENT DOCUMENTS

| | | | |
|---|---|---|---|
| 57-146283 | 9/1982 | Japan . | |
| 60-216303 | 10/1985 | Japan | 430/2 |
| 61-6681 | 1/1986 | Japan . | |
| 62-36606 | 2/1987 | Japan . | |
| 1-159682 | 6/1989 | Japan | 430/2 |
| 1502456 | 8/1989 | Japan . | |
| 4365085 | 12/1992 | Japan . | |
| 5204286 | 8/1993 | Japan . | |
| 558175 | 8/1993 | Japan . | |
| 567951 | 9/1993 | Japan . | |
| 2226421 | 6/1990 | United Kingdom . | |

*Primary Examiner*—Martin Angebranndt
*Attorney, Agent, or Firm*—Cushman, Darby & Cushman IP Group of Pillsbury Madison & Sutro LLP

[57] ABSTRACT

Disclosed is a method for producing an optical member having excellent optical characteristics. An optical member is composed of a support plate and an optical sheet stuck on said plate via an optical adhesive. The optical adhesive is made sticky after it is coated, including ultraviolet-curing adhesives, epoxy adhesives and their mixtures. To produce the optical member, the optical sheet is formed on the surface of a fixed substrate via a transfer film. The optical adhesive is coated onto the optical sheet, the adhesive is made sticky on the sheet, the fixed substrate is peeled off, the sheet is stuck onto the support plate using the adhesive, and the adhesive is cured.

25 Claims, 26 Drawing Sheets

PRESSURE ADHESION

PRESSURE ADHESION

METHOD FOR PRODUCING OPTICAL MEMBER

CROSS REFERENCE TO RELATED APPLICATION

This is a continuation of application No. 08/391,672, filed on Feb. 17, 1995, now abandoned.

This application is based upon and claims the benefit of priority of the prior Japanese Patent applications No. 6-45018 filed on Feb. 18, 1994 and No. 6-128261 filed on May 17, 1994, the contents of which are incorporated herein by reference.

BACKGROUND OF THE INVENTION

1. Field of the Invention

The present invention relates to a method for producing an optical member. The optical member of the present invention may be disposed, for example, in a windshield for cars, etc. and may be applied to a display panel in a heads up display device.

2. Related Arts

A hologram film has been used as an optical member, especially as a thin filmy optical member. A hologram film is obtained by exposing a photosensitive film to light to form interference fringes which create the holographic image. Since such a hologram film is flexible and is extremely thin, it can be sealed, for example, in a windshield for cars, etc. to be used as a display panel in a heads-up display device.

In order to obtain a high-quality display image, the hologram film must be stuck onto the glass substrate without being wrinkled or forming a gap between itself and the glass substrate. For mounting on cars, for example, as a member of a heads-up display device, the hologram film must have satisfactory heat resistance.

Where the hologram film is stuck onto a support plate, such as a windshield glass, etc., an optical adhesive may be used. A semi-curing acrylic adhesive, for example, has been used the optical adhesive. The adhesiveness of such an adhesive is not completely cured. Such a semi-curing acrylic adhesive can be coated thin onto a substrate by spin coating. Also, since the adhesive is sticky, it can be used for sticking a hologram film onto a support plate without wrinkling the film or forming a gap between the film and the support plate.

However, the adhesive has the following problems with regard to heat resistance.

When a semi-curing acrylic adhesive is exposed to a high-temperature atmosphere at 80° C. or higher, its adhesiveness is noticeably lowered. For example, if the temperature inside a car that has been parked outdoors in summer rises, thereby causing a decrease in the adhesiveness of the adhesive used, the hologram film will peel off the support plate, such as a windshield, etc. The thus-peeled film will be shrunk by the heat, and its optical characteristics will be changed. In such a case, the display image reproduced onto the hologram film will be deformed or unsharp thus lowering the quality of the reproduced image. In particular, when a hologram film is sealed in a windshield, two sheets of glass are hot-sealed under pressure at high temperatures whereupon the above-mentioned shrinkage of the hologram film is inevitable.

SUMMARY OF THE INVENTION

The present invention has been made in consideration of the above-mentioned problems, and its essential object is to provide a method for producing an optical member where an optical sheet, typically such as a hologram film, is properly stuck onto a support plate.

For this object, in the present invention, an ultraviolet-curing adhesive is used as the optical adhesive for sticking the optical sheet onto the support plate to obtain an optical member in the manner mentioned below. Specifically, an ultraviolet-curing adhesive is coated onto one surface of an optical sheet or a support plate, while the adhesive is not sticky. Thereafter, the adhesive coated on the surface is treated so as to stick thereonto, and the thus-coated part is stuck onto the other part. (When the ultraviolet-curing adhesive is coated onto an optical sheet, then the thus-coated sheet is stuck onto a support plate; but when it is coated onto a support plate, then the thus-coated plate is stuck onto an optical sheet.) The treatment to make the ultraviolet-curing adhesive, that has been coated onto one surface of an optical sheet or a support plate, stick onto the surface can be realized by heating the adhesive or by exposing it to ultraviolet rays.

The matter that shall be specifically noted in this method is that the adhesiveness of the ultraviolet-curing adhesive is caused after the adhesive has been coated onto either an optical sheet or a support plate and thereafter the sheet and the plate are stuck together. In other words, the adhesive is not sticky while it is being coated. Accordingly, the ultraviolet-curing adhesive can be coated thin and uniformly onto the surface to be made sticky. This means that the thickness of the ultraviolet-curing adhesive coated on the surface can be wholly uniform even after the adhesive has been made sticky after the stickiness-imparting treatment of the coated adhesive. Using an adhesive of this type, therefore, it is possible to evenly attach an optical sheet to a support plate to obtain an optical member having excellent optical characteristics in which the optical characteristics do not fluctuate locally.

According to the method of the present invention, an ultraviolet-curing adhesive of this type is made sticky after it has been coated onto one surface of either an optical sheet or a support plate, and thereafter the optical sheet and the support plate are stuck together. Therefore, the adhesion between the optical sheet and the support plate is enhanced due to the thus-caused stickiness of the adhesive therebetween.

The ultraviolet-curing adhesive can be cured by irradiating ultraviolet rays thereto, after the optical sheet and the support plate have been firmly stuck together via the adhesive between them. Accordingly, the optical sheet can be surely fixed onto the surface of the support plate. In other words, since ultraviolet rays are used for curing the adhesive and since no heat is used for the curing, the optical sheet is neither shrunk nor deformed and the optical characteristics of the optical sheet are not changed. In addition, even though the cured optical member is kept at high temperatures while it is in practical use or when it is sealed in a windshield under heat and pressure, the optical sheet in the member is neither shrunk nor deformed by the heat, since the sheet is securely fixed onto the support plate. Thus, there is provided according to the method of the present invention an optical member having excellent optical characteristics.

The optical sheet for use in the present invention includes, for example, a hologram film, as well as a hologram layer, a hologram plate, a polarizing film, a polarizing layer, a polarizing plate, a light-reflecting film, a light-reflecting layer, a light-reflecting plate, a non-glare film, a non-glare layer, a non-glare plate, a partially light-reflecting, partially light-transmitting film, a partially light-reflecting, partially light-transmitting layer, a partially-light reflecting, partially light transmitting plate, a diffraction-grating film, an interference filter film, a color filter film, etc.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
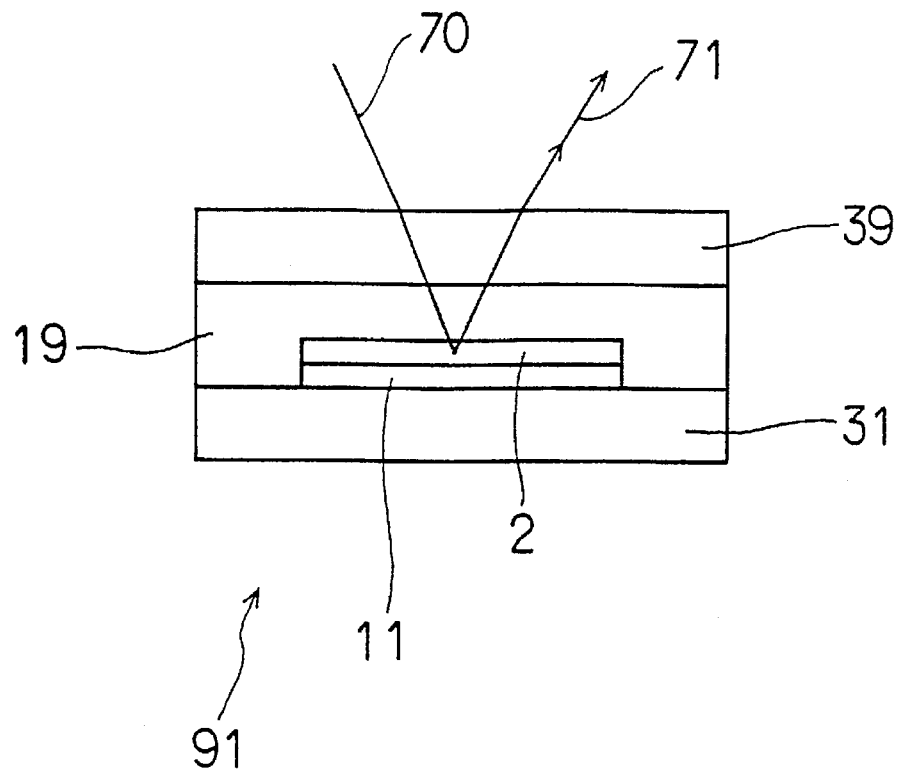
FIG. 1 is an explanatory view illustrating an optical member of the first embodiment of the present invention.

According to the present invention, ultraviolet-curing adhesive is used as the optical adhesive for sticking an optical sheet onto a support plate. The ultraviolet-curing adhesive is coated onto one surface of an optical sheet or a support plate, while the adhesive is not sticky as yet, and thereafter the adhesive is treated to become sticky and the adhesive-coated optical sheet or support plate is thus stuck onto the other part to obtain an optical member. (Specifically, when the ultraviolet-curing adhesive is coated onto an optical sheet, then the thus-coated sheet is stuck onto a support plate; but when it is coated onto a support plate, then the thus-coated plate is stuck onto an optical sheet.)

The optical sheet to be stuck onto the support plate may be prepared as follows. First, a transfer film is formed on the surface of a fixed substrate, and an optical sheet is disposed on the transfer film. In this way, a thin optical sheet can be stuck onto the support plate. In the instance in which a hologram film is used as the optical sheet, the hologram film is formed by dropping a photosensitive agent onto a transfer film to coat the film, followed by exposing, developing and drying the coat on the transfer film. Polymer films of polycarbonates, amorphous polyolefins, methacrylic resins, polyesters, polyacrylates, transparent epoxy resins, etc. can be used as the transfer film.

The above-mentioned fixed substrate is to facilitate the formation of a flexible optical sheet. In general, this is peeled from the optical sheet before the sheet is stuck onto a support plate. However, the peeling may be conducted after the optical sheet has been stuck onto a support plate.

The above-mentioned transfer film may be peeled from the optical sheet after the optical sheet has been stuck onto a support plate via the above-mentioned ultraviolet-curing adhesive and after the adhesive has been cured between the sheet and the plate.

If desired, a peripheral adhesive may be coated around the optical sheet, after the sheet has been stuck onto a support plate. In this way, the peeling of the optical sheet off of the support plate as a result of high temperatures, etc. can be inhibited more surely. The peripheral adhesive for this purpose is not specifically defined, including, for example, ultraviolet-curing epoxy adhesives, heat-resistant epoxy adhesives, etc.

The optical member of the present invention can be sealed in a windshield, for example, as follows. First, the transfer film is peeled off of the optical sheet, a surface adhesive is coated onto the surface of the optical sheet, the optical sheet coated with the surface adhesive is sandwiched between a support plate and a cover plate, and these are laminated under pressure or with an adhesive. Since the optical sheet is sandwiched and sealed between these two plates in this way, in practical use it is protected from the external environment such as air and moisture.

The surface adhesive to be used for this purpose is not specifically defined, including, as preferred examples, polyvinyl butyral, NOA61 (available from Nortland Co.), etc.

The support plate and the cover plate may be glass, resins, or the like. These may have various shapes, including, for example, tabular plates, curved plates, etc.

The adhesion between the optical sheet and the support plate will be described in detail hereinunder. The optical sheet may be supplied to the support plate in the same manner as that mentioned above.

An ultraviolet-curing adhesive is supplied to one surface of an optical sheet, one surface of a support plate, or to both surfaces, before the optical sheet is attached to the support plate. In the instance in which the ultraviolet-curing adhesive is supplied to one surface of an optical sheet, the adhesive is coated onto the surface of the optical sheet disposed on a transfer film while the adhesive is not sticky as yet, as so mentioned hereinabove, and thereafter the adhesive is treated to become sticky. Afterwards, this is stuck onto a support plate of the other part. On the other hand, where an ultraviolet-curing adhesive is supplied to a support plate, the adhesive is coated onto a support plate while the adhesive is not sticky as yet, and thereafter the adhesive is treated to become sticky. Afterwards, the other part of an optical sheet having a transfer film thereon, as mentioned hereinabove, is stuck onto the sticky surface of the thus-coated support plate.

Since the ultraviolet-curing adhesive does not exhibit stickiness during its coating, the adhesive can be formed thin and uniformly onto the surface. This means that the thickness of the ultraviolet-curing adhesive coated on the surface can be wholly uniform even after the adhesive has been made sticky after the stickiness-imparting treatment of the coated adhesive. Using the adhesive of this type, therefore, it is possible to evenly attach an optical sheet to a support plate to obtain an optical member having excellent optical characteristics in which the optical characteristics do not fluctuate locally.

According to the method of the present invention, since the ultraviolet-curing adhesive is made sticky after it has been coated onto one surface of either an optical sheet or a support plate, and thereafter the optical sheet and the support plate are stuck together. Therefore, the adhesion between the optical sheet and the support plate is enhanced due to the thus-caused stickiness of the adhesive therebetween.

The ultraviolet-curing adhesive can be cured by irradiating ultraviolet rays thereto, after the optical sheet and the support plate have been firmly stuck together via the adhesive therebetween. Accordingly, the optical sheet can be securely fixed onto the surface of the support plate. In addition, since ultraviolet rays are used for curing the adhesive and since no heat is used for the curing, the optical sheet is neither shrunk nor deformed and the optical characteristics of the optical sheet are not changed. Moreover, even though the cured optical member is kept at high temperatures while it is in practical use or when it is sealed in a windshield glass under heat and pressure, the optical sheet in the member is neither shrunk nor deformed by heat, since the sheet is securely fixed onto the support plate. Thus, there is provided according to the method of the present invention an optical member having excellent optical characteristics.

Ultraviolet-curing epoxy resin adhesives (e.g., 3103, 3112, 3013B, all available from Three Bonds Co.), acrylic adhesives and modified methacrylate adhesives of which the stickiness is completely curable (e.g., FMD-207 available from Loctite Co.), modified acrylate adhesives (e.g., LP-47 available from Loctite Co.), etc., can be used as the ultraviolet-curing adhesive in the present invention, for example.

The ultraviolet-curing adhesive for use in the present invention may contain a thermosetting component that is curable at low temperatures of 100° C. or lower. Where the adhesive of this type is made sticky through heating, the heating time may be shortened and the adhesive may be made sticky rapidly.

As one example, a cold-curing epoxy adhesive may be incorporated into the ultraviolet-curing adhesive for use in the present invention. Preferred examples of the mixed adhesive include a mixture composed of an ultraviolet-curing epoxy-modified acrylic adhesive and a heat-resistant epoxy adhesive, a mixture comprising an ultraviolet-curing epoxy adhesive and a heat-resistant epoxy adhesive, a mixture comprising a modified acrylic adhesive and a heat-resistant epoxy adhesive, etc. Of these, mixtures comprising an ultraviolet-curing epoxy adhesive are easy to prepare.

The treatment for making the ultraviolet-curing adhesive sticky may be effected by irradiation of ultraviolet rays to the coated adhesive. In this case where a mixture composed of an ultraviolet-curing epoxy-modified acrylic adhesive and a heat-resistant epoxy adhesive is used, the mixing ratio of the two components is preferably from 2/10 to 9/10. If the mixing ratio of the ultraviolet-curing epoxy-modified acrylic adhesive to the other in the mixture is less than 2/10, the initial stickiness of the mixture will be difficult to exhibit through ultraviolet irradiation thereof and the mixture will be difficult to cure also through ultraviolet irradiation thereof. On the other hand, if said mixing ratio is more than 9/10, the adhesive will be solidified too rapidly by ultraviolet irradiation thereto with the result that the initial stickiness is difficult to obtain. If so, in addition, the heat resistance of the adhesive will be somewhat worsened.

Where the ultraviolet-curing adhesive is made sticky by ultraviolet irradiation thereto, an ultraviolet catalyst may be incorporated into the adhesive by which the time for the ultraviolet irradiation may be shortened. The treatment for making the ultraviolet-curing adhesive sticky is preferably effected by ultraviolet irradiation of the adhesive. This is because, since the curing of the adhesive after the adhesion of the optical sheet and the support plate via the adhesive is conducted by ultraviolet irradiation thereto, the method of the present invention does not require any heat treatment to prepare an optical member and the operation of the method may be simplified.

When the ultraviolet-curing adhesive to be coated onto the surface of the optical sheet or the support plate for forming the optical member of the present invention has a low viscosity, it may be coated onto said surface by spin-coating, bar-coating, etc. If, however, it has a relatively high viscosity, it may be coated onto the same by printing, transfer, etc.

The thickness of the ultraviolet-curing adhesive to be coated onto the surface is preferably from 1 µm to 100 µm. This is because, if it is less than 1 µm, the adhesion strength between the optical sheet and the support plate is lowered. On the other hand, if it is more than 100 µm, it becomes difficult to stick the optical sheet along the support plate.

The thickness of the optical sheet is preferably from 1 µm to 10 mm. In particular, in the case that a hologram film is used as the optical sheet, the thickness is preferably from 1 µm to 100 µm, more preferably from 5 µm to 30 µm. If the thickness of the hologram film is less than 1 µm, the film cannot sufficiently record interference fringes so that it will often fail to be holographic. On the other hand, if it is more than 100 µm, the preparation of a uniform hologram is difficult. In the instance in which the optical sheet for use in the present invention has a base film (having a thickness of approximately from 30 µm to 300 µm) or a base plate (having a thickness of approximately from 300 µm to 10 mm), in addition to the optical film participating in the optical characteristics of the sheet, the total thickness of the optical sheet comprising these should fall within the range between 1 µm and 10 mm.

Preferred embodiments of the present invention will be mentioned below, with reference to the drawings attached hereto.

First Embodiment

An optical member of the first embodiment of the present invention will be described, with reference to FIG. 1 to FIG. 7.

The optical member of this embodiment is a hologram member to be used in a heads-up display for cars.

As shown in FIG. 1, an optical member 91 is composed of a support plate 31, and an optical sheet 2 stuck on said support plate via an optical adhesive 11.

The optical adhesive 11 is an ultraviolet-curing adhesive.

To the surface of the optical sheet 2, attached is a cover plate 39 via a surface adhesive 19.

The optical sheet 2 is a hologram layer having holographic interference fringes formed thereon. The support plate 31 and the cover plate 39 are made of a windshield glass for cars.

The optical adhesive 11 is an ultraviolet-curing adhesive, such as a modified acrylate adhesive (e.g., FMD-207 available from Loctite Co.), a modified methacrylate adhesive, an epoxy adhesive, an acrylic adhesive, or a mixture of these, etc.

The surface adhesive 19 is polyvinyl butyral.

The thickness of the optical sheet 2 is 20 µm, and the thickness of the optical adhesive 11 is from 10 µm to 20 µm. The total thickness of the optical sheet 2 and the optical adhesive 11 is preferably from 30 µm to 40 µm. This is because these are sealed between the support plate 31 and the cover plate 39 to be a windshield.

Next, the method for producing the optical member of this embodiment will be described, with reference to FIG. 2 to FIG. 7.

Figure 2:
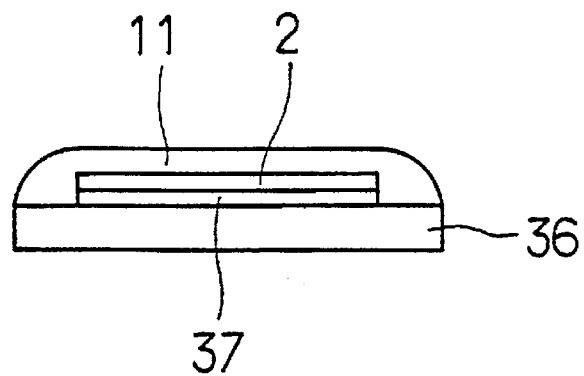
FIG. 2 is a view showing the condition where an optical sheet has been disposed on a transfer sheet and coated with an optical adhesive.

First, as shown in FIG. 2, a transfer film 37 is formed on the surface of a fixed substrate 36. Next, a photosensitive agent is uniformly coated onto the surface of the transfer film 37, then exposed and developed to give the optical sheet 2 having holographic interference fringes therein.

Next, the optical adhesive 11 is uniformly coated onto the surface of the optical sheet 2. The coating method is not specifically defined, as far as the optical adhesive 11 can be coated thin and uniformly onto the surface. As one example, a spin-coating method (1000 rpm to 2000 rpm) can be employed. The thickness of the optical adhesive 11 is from 5 µm to 20 µm.

Next, the optical adhesive 11 is heated at 80° C. for 5 to 10 minutes thereby to exhibit its initial stickiness. If the heating temperature of 80° C. has an influence on the optical sheet 2, the optical adhesive 11 may be heated at 50° C. for from 20 to 30 minutes for it to exhibit its initial stickiness. On the other hand, if higher temperatures have no influence on the optical sheet 2, the optical adhesive 11 may be heated at 100° C. for about 2 to 3 minutes for it to exhibit its initial stickiness.

Next, the optical sheet 2 is peeled from the fixed substrate 36 along with the transfer film 37 and the optical adhesive 11.

Figure 3:
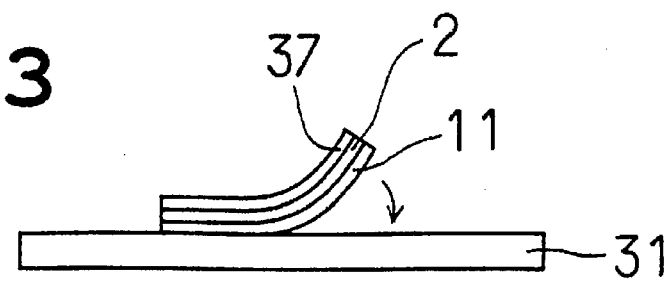
FIG. 3 through FIG. 7 are explanatory views showing the process for producing the optical member of FIG. 1, where the optical sheet shown in FIG. 2 is stuck onto a support plate.
Figure 4:
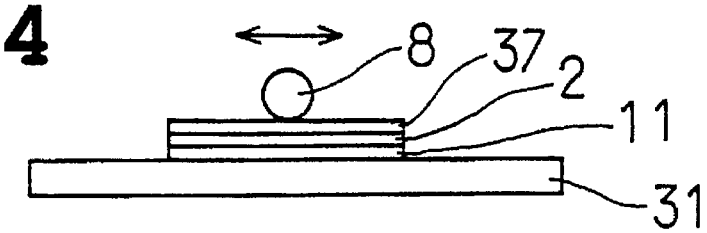

Next, as shown in FIG. 3, the optical sheet 2 is stuck onto the support plate 31 via the optical adhesive 11. As shown in FIG. 4, the optical sheet 2 is sufficiently pressed against the support plate 31, using a roller 8, by which the former is uniformly stuck onto the latter. Next, the optical adhesive 11 is completely cured by the ultraviolet irradiation thereof. The direction of the ultraviolet irradiation is not specifically defined. The ultraviolet irradiation dose is from 500 to 3000 mJ/cm$^2$.

Figure 5:
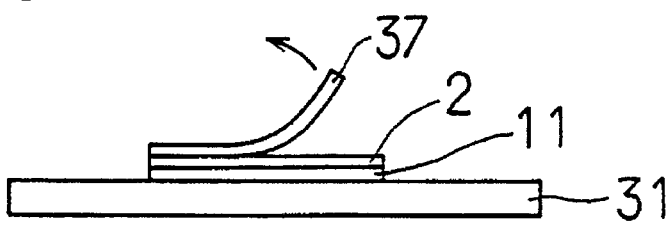
Figure 6:
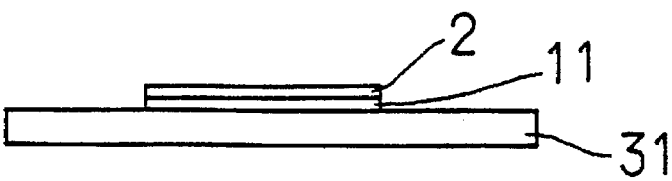

Then, as shown in FIG. 5, the transfer film 37 is peeled off of the optical sheet 2. After this, the attachment of the optical sheet 2 to the support plate 31 is completed, as shown in FIG. 6.

Figure 7:
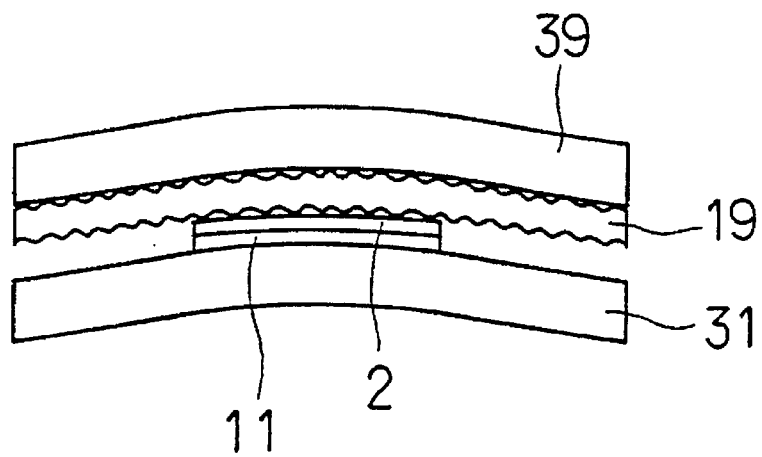

Thereafter, the optical sheet is de-watered by heating it. Next, as shown in FIG. 7, the cover plate 39 is laminated under pressure onto the surface of the optical sheet 2 via the surface adhesive 19 after which the optical member 91 shown in FIG. 1 is obtained.

As shown in FIG. 1, the above-mentioned optical member 91 is constructed in such a way that an incident ray 70 participating in the image to be displayed is diffracted and reflected by the optical sheet 2 to give a regenerated ray 71 and the displayed image is viewed through the regenerated ray 71.

Below, the function and the effect of the present embodiment will be described.

According to the method for producing the optical member of the present embodiment, the optical adhesive 11 is first coated onto the optical sheet 2 and thereafter this is made sticky on the sheet 2. Therefore, the adhesive 11 can be coated thin and uniformly onto the sheet 2. In addition, as shown in FIG. 3, the optical sheet 2 is stuck onto the support plate 31 after the optical adhesive 11 on the sheet 2 has been made sticky. Therefore, the optical sheet 2 is firmly stuck onto the support plate 31 due to the stickiness of the optical adhesive 11, and the strong adhesion between the sheet 2 and the plate 31 may be maintained for a long time.

The sticky optical adhesive 11 is cured while it is present between the optical sheet 2 and the support plate 31 that have been tightly stuck together via the adhesive 11. Therefore, the optical sheet 2 is securely fixed on the surface of the support plate 31. For these reasons, the optical sheet is neither shrunk nor deformed during the curing of the adhesive, and the optical characteristics of the optical sheet are not changed during the curing. Moreover, the optical adhesive 11 is not thermally deformed even at a temperature of about 125° C. under pressure at 10.0 kg/cm$^2$ for the pressure lamination.

Accordingly, the optical member 91 having excellent optical characteristics can be produced.

After the de-watering under heat, the optical sheet 2 is sealed between the support plate 71 and the cover plate 39, as shown in FIG. 7. Therefore, the optical sheet 2 can be protected from outdoor air while the optical member 91 is actually used.

As a result, the optical member 91 can reproduce a sharp display image, while exhibiting excellent holographic characteristics. In addition, the life of the optical member 91 is long.

In this embodiment, the support plate 31 and the cover plate 39 are of a windshield for cars, and the optical sheet 2 is sealed between the both plates via the optical adhesive 11. A windshield is required to be of a quality this is high and exceeds the safety standard for laminate glass for cars. The optical adhesive 11 used in this embodiment has a high adhesiveness and is colorless and transparent, and its thickness coated is from 1 µm to 20 µm. Therefore, the optical member of this embodiment has excellent adhesiveness and transparency and is very thin, satisfying the above-mentioned safety standard. In addition, this is free from the deformation of the display image formed. The optical member of this embodiment was subjected to an impact test and a penetration test, which gave satisfactory impact-resistant and penetration-resistant results. Thus, the optical member of this embodiment was verified to be of a quality which is high and excess the above-mentioned safety standard.

Second Embodiment

Figure 8:
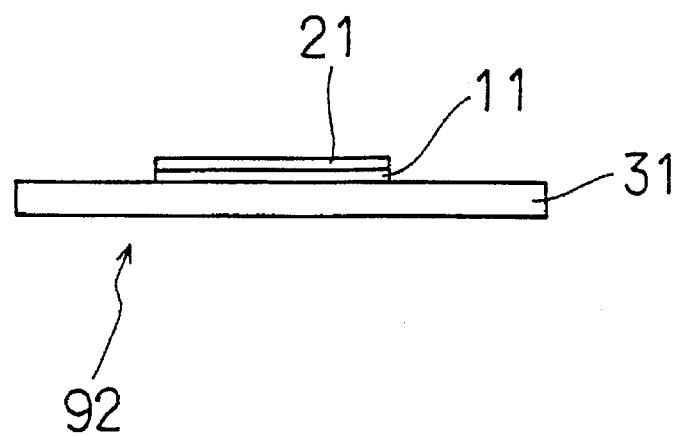
FIG. 8 is an explanatory view illustrating an optical member of the second embodiment of the present invention.

FIG. 8 shows an optical member 92 of the second embodiment, which has a thin, selectively reflecting layer as the optical sheet 21. The thickness of the optical sheet 21 is about 20 µm.

The optical sheet 21 is stuck onto a support plate 31, via an optical adhesive 11. The optical adhesive 11 is the same ultraviolet-curing adhesive as in Example 1, and its thickness is from 5 µm to 20 µm. The support plate is made of glass.

In the optical member 92 of this embodiment, the optical sheet 21 is thin so that delicate control of the thickness of the sheet 21 is required. As the optical adhesive 11 used herein has excellent heat resistance, it does not cause shrinkage of the optical sheet 21 even at high temperatures and there is no change in the optical characteristics of the optical sheet 21.

Third Embodiment

Figure 9:
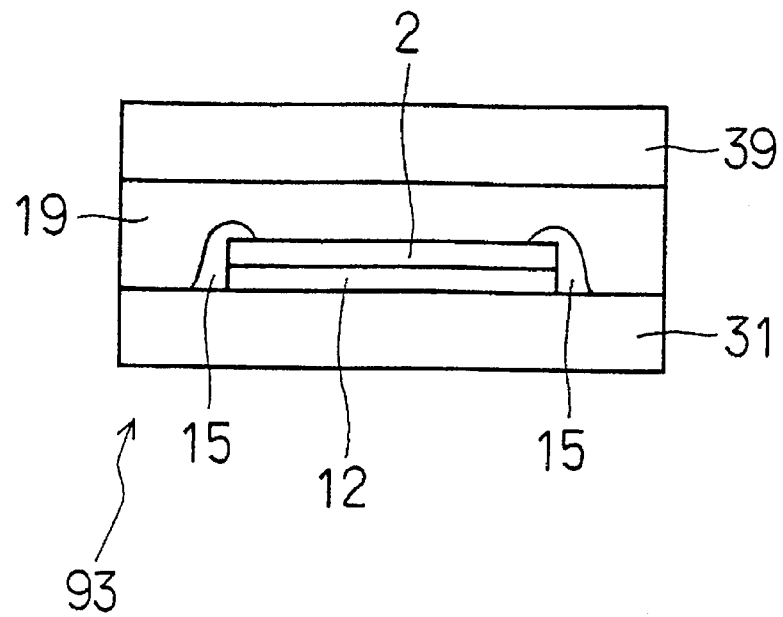
FIG. 9 is an explanatory view illustrating an optical member of the third embodiment of the present invention.

FIG. 9 shows an optical member 93 of the third embodiment, in which a peripheral adhesive 15 is coated around the optical sheet 2. Otherwise the optical member 93 is the same as that in the first embodiment.

The method for producing the optical member of this embodiment is described in detail, with reference to FIG. 10 to FIG. 19.

Figure 10:
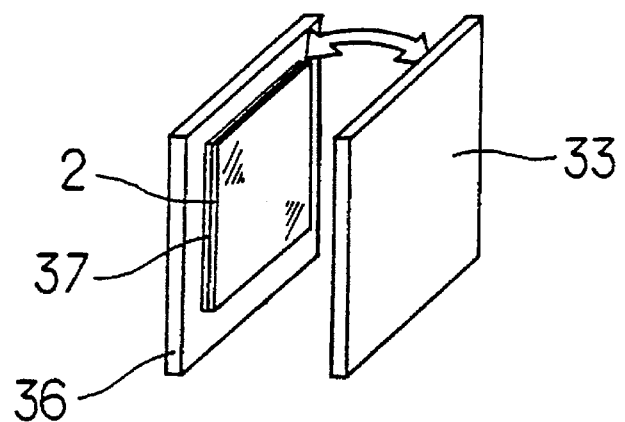
FIG. 10 is an explanatory view of the process of the third embodiment, indicating the relationship between the fixed substrate and the glass plate in an oven.

First, as shown in FIG. 10, a transfer film 37 is formed on the surface of an exposure part (or a fixed base) 36, and an optical sheet 2 having holographic interference fringes therein is formed on the surface of the transfer film 37.

Briefly, the optical sheet 2 is formed on said surface by coating a photosensitive agent onto the surface of the transfer film 37 followed by exposing and developing it.

Then, the optical sheet 2 is placed upright in an oven at 80° C. along with but separately from a cover glass 33 and heated therein for 10 minutes.

Thereafter, the cover glass 33 is closely attached to the surface of the optical sheet 2 in order that the optical sheet 2 is protected from air, and this is taken out of the oven. Next, this is placed in a nitrogen atmosphere for about 10 minutes and cooled to room temperature. Its dew point shall be −5° C. or lower.

Next, the cover glass 33 is removed from the optical sheet 2, and the optical sheet 2 is set on a spinner. Next, about 5 g of an optical adhesive is placed dropwise onto the whole surface of the optical sheet 2. The optical adhesive used herein is an epoxy adhesive, 3102 available from Three Bonds Co. Next, the sheet 2 is rotated at 2000 rpm, whereby the thickness of the ultraviolet-curing optical adhesive coated is made uniform.

Figure 11:
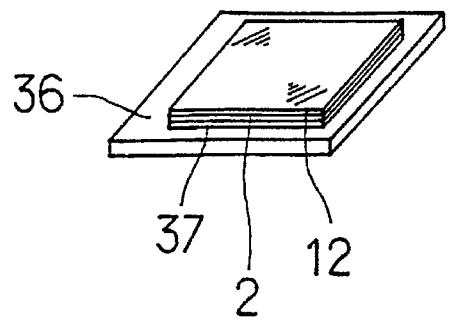
FIG. 11 is an explanatory view of the process of the third embodiment, indicating the position of the fixed substrate in an oven.

After that, as shown in FIG. 11, the optical sheet 2 is put in an oven at 80° C. for 7 minutes, while it is kept horizontal, with the surface of the optical adhesive 12 facing upward. Through this treatment, the initial stickiness is imparted to the optical adhesive 12.

Next, this is cooled to room temperature in a nitrogen atmosphere. Its due point shall be −5° C. or lower.

Figure 12:
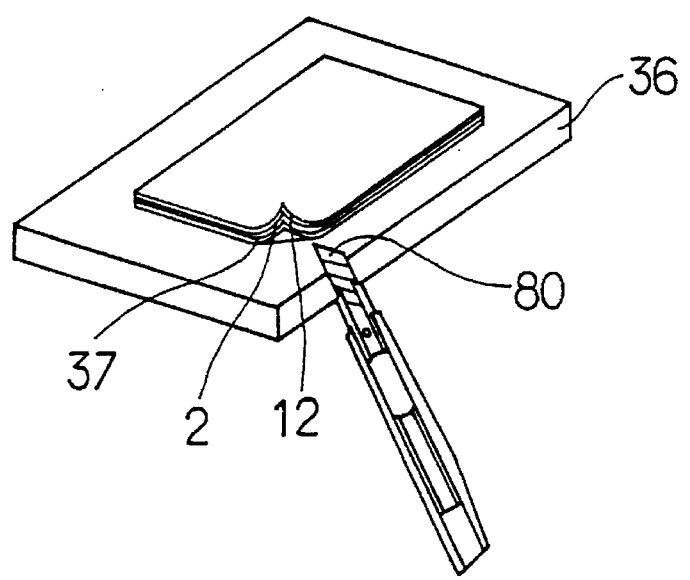
FIG. 12 is an explanatory view of the process of the third embodiment, indicating the way of peeling the optical sheet.

Then, as shown in FIG. 12, the optical sheet 2 is peeled from the exposure part 32 along its periphery, using the edge 80 of a cutter.

Figure 13:
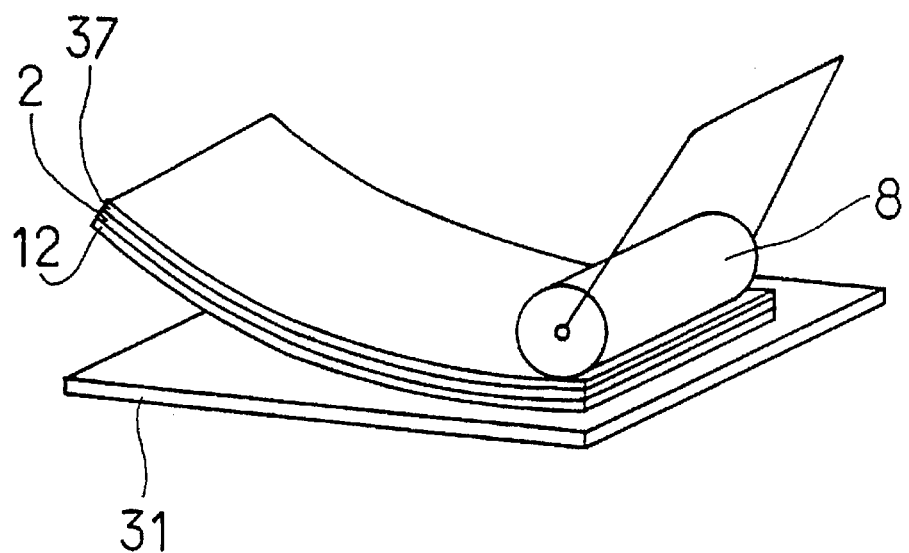
FIG. 13 is an explanatory view of the process of the third embodiment, indicating the way of sticking the optical sheet.

Next, as shown in FIG. 13, the optical sheet 2 is stuck onto a support plate 31 via the optical adhesive 12. Then, using a roller 8, the thus-stuck sheet is pressed to the plate 31 about 10 times from its every side to a determined direction.

Then, this is exposed to a high-pressure mercury lamp, and the optical adhesive 12 is cured by the ultraviolet rays irradiated from the lamp. The energy amount emitted by the high-pressure mercury lamp shall be 600 mJ/cm$^2$ or less.

Figure 14:
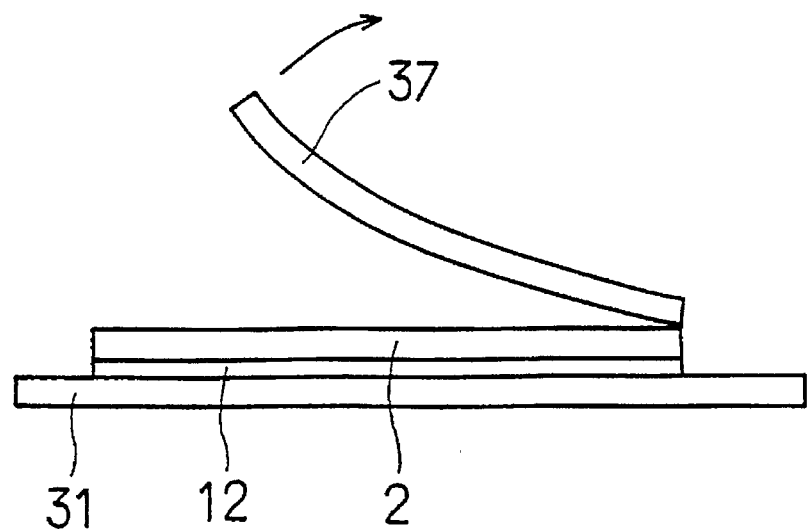
FIG. 14 is an explanatory view of the process of the third embodiment, indicating the way of peeling the transfer film.

After the adhesive has been cured by ultraviolet rays, the transfer film 37 is peeled from the optical sheet 2, as shown in FIG. 14. It is easy to peel the transfer film 37 from the sheet 2 if the edge of a cutter is inserted between the film 37 and the sheet 2 from the periphery of the transfer film 37.

Figure 15:
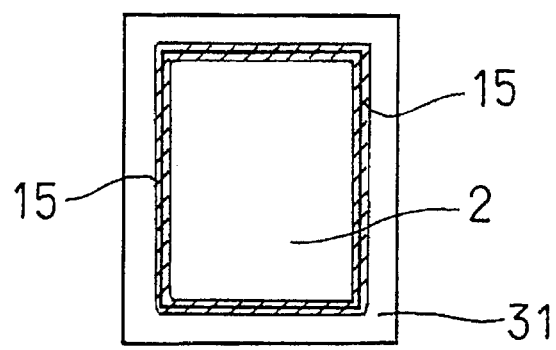
FIG. 15 is an explanatory view of the process of the third embodiment, indicating the conditions under which the peripheral adhesive has been coated.
Figure 16:
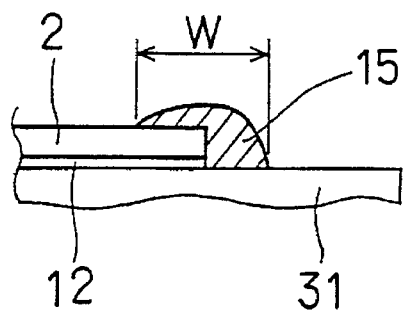
FIG. 16 is an enlarged view illustrating in detail the conditions of said adhesive coating.
Figure 17:
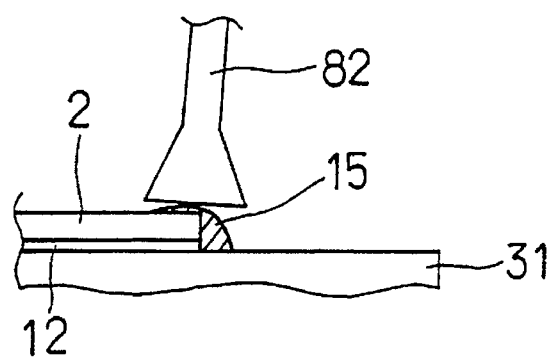
FIG. 17 is a view illustrating the step for smoothing the surface coated with said peripheral adhesive.

Then, a peripheral adhesive 15 such as an epoxy adhesive, 3102 available from Three Bonds Co. is coated all over the periphery of the optical sheet 2 at a width, W of about 3 mm, using a spatula or the like, as shown in FIG. 15 and FIG. 16. Next, the surface of the thus-coated peripheral adhesive 15 is smoothed with a spatula 82, as shown in FIG. 17. Next, this is exposed to a high-pressure mercury lamp, by which the peripheral adhesive 15 is cured. The energy amount emitted by the high-pressure mercury lamp shall be 2400 mJ/cm$^2$. The irradiation intensity shall be 500 mW/cm$^2$ or less.

Figure 18:
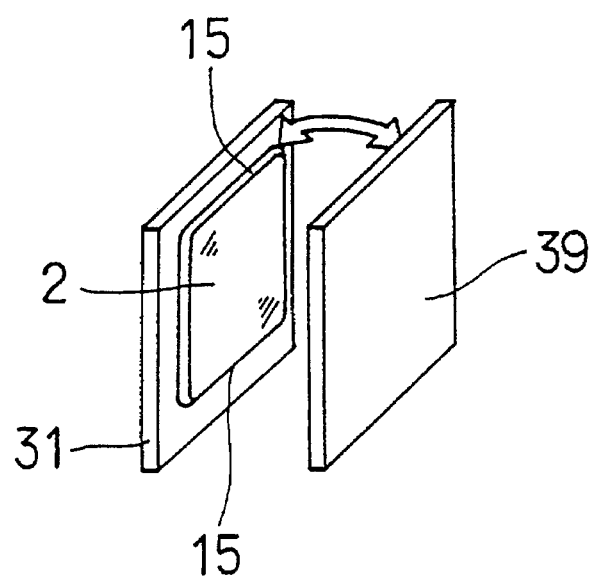
FIG. 18 is an explanatory view of the process of the third embodiment, indicating the relationship between the support plate and the cover plate in an oven.

Then, the support plate 31 having the optical sheet 2 stuck thereon and another plate 39 are put in an oven for 10 minutes to be heated, as shown in FIG. 18. Next, the other plate 39 is closely attached to the surface of the optical sheet 2 in order that the optical sheet 2 is protected from air, and this is taken out from the oven.

After that, this is cooled to room temperature. Its dew point shall be −5° C. or lower.

Figure 19:
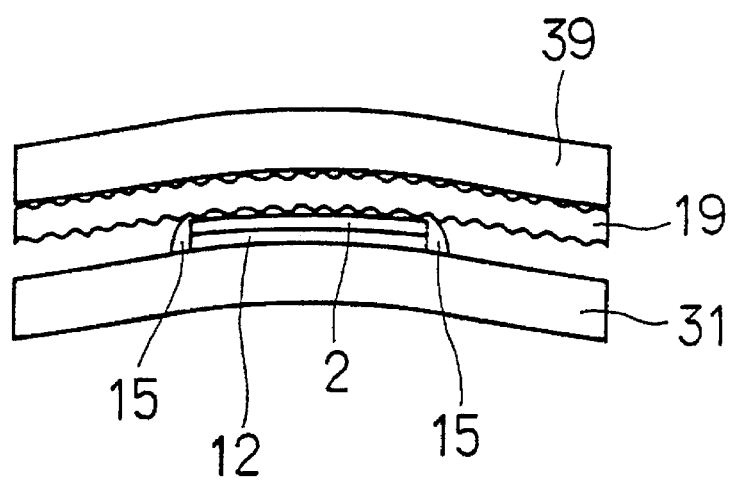
FIG. 19 is an explanatory view of the process of the third embodiment, indicating the way in which the support plate and the cover plate is laminated under pressure.

Next, as shown in FIG. 19, the support plate 31 and the other plate 39 are temporarily laminated under pressure via a surface adhesive 19, while sandwiching the optical sheet 2 therebetween. The surface adhesive 19 is polyvinyl butyral.

Next, this is put into an oven and heated at about 135° C. therein. By this heating, the lamination of the constitutive layers is completed.

After this process, the optical member 93 shown in FIG. 9 is obtained.

In this embodiment, the peripheral adhesive 15 is coated around the optical sheet 2. Accordingly, the optical sheet 2 is not peeled off of the support plate at its periphery during the production of the optical member. Therefore, the optical sheet 2 can be stuck more securely onto the support plate 31. In addition, the optical sheet 2 is protected from air.

Except for the provision of the peripheral adhesive 15, the optical member of this embodiment has the same effect as that of the optical member of the first embodiment.

Fourth Embodiment

To produce optical members of the fourth embodiment, any of the ultraviolet-curing adhesives (sample Nos. 1 to 5) shown in Table 1 (see page 28) is used. The others are the same as those in the third embodiment.

Using any of the adhesives in the table 1, the optical members of this embodiment have the same effect as that of the optical member of the third embodiment.

Fifth Embodiment

Figure 20:
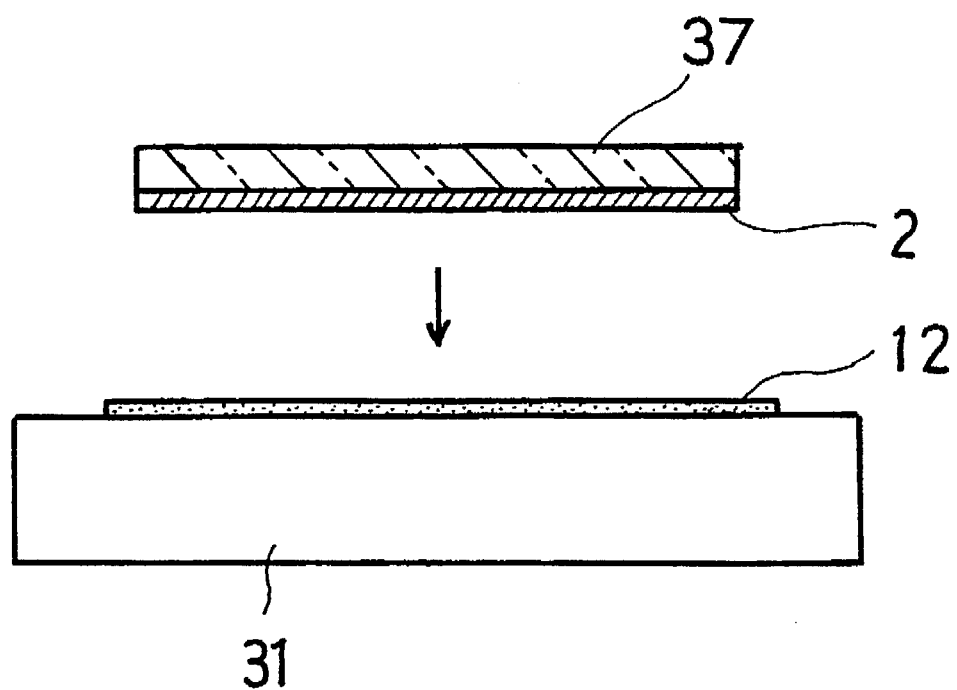
FIG. 20 is a view indicating one condition during the process of the fifth embodiment of the present invention.

In the above-mentioned embodiments, the ultraviolet-curing adhesive was coated onto the optical sheet formed on the transfer film, and the thus-coated optical sheet was heated to make the adhesive thereon have a pre-determined degree of stickiness. After this, the optical sheet was stuck onto the support plate via the ultraviolet-curing adhesive. In this embodiment, however, the ultraviolet-curing adhesive is coated onto the support plate, and a pre-determined amount of ultraviolet rays are irradiated thereto to make the adhesive thereon have a pre-determined degree of stickiness, as shown in FIG. 20. After this, the optical sheet formed on the transfer film is stuck onto the support plate via the ultraviolet-curing adhesive.

of ultraviolet rays are irradiated to the ultraviolet-curing adhesive 12, by which the adhesive 12 on the substrate glass 31 is made sticky. By this ultraviolet irradiation, the stickiness of the adhesive 12 is elevated from 0.3 μ/25 mm to 3 μ/25 mm (measured by the peeling test at 180° C. according to JIS Z-0237). The stickiness of 0.3 μ/25 mm corresponds to the above-mentioned viscosity of 960 cp at 25° C.

To this sticky adhesive, attached is an optical sheet, hologram element 2. Specifically, the hologram element 2 formed on the transfer film 37 is attached to the support plate 31 via the adhesive 12.

Again, ultraviolet rays are irradiated to this, by which the adhesive 12 is cured. The energy amount for the ultraviolet irradiation is 15 J/cm$^2$. After this, the hologram element 2 is firmly stuck onto the substrate glass 31.

The ultraviolet radiation device used herein emits ultraviolet rays at 27 mW/cm$^2$.

According to this embodiment, the optical sheet can easily be stuck onto the support plate. In this embodiment, the stickiness of the adhesive is increased 10 times by the stickiness-increasing treatment. However, when the stickiness is increased at least about 3 times by this treatment, then the optical sheet can easily be stuck onto the support plate via the adhesive.

The following embodiments are to further improve the above-mentioned embodiments.

Sixth Embodiment

If, at the time when a hologram film to be the optical sheet for use in the present invention is formed, the wettability between the transfer film and the photosensitive agent to be placed dropwise thereonto is poor, it is difficult to uniformly spread the photosensitive agent on the transfer film. In this embodiment, a particular measure is employed so as to overcome this problem.

Figure 32:
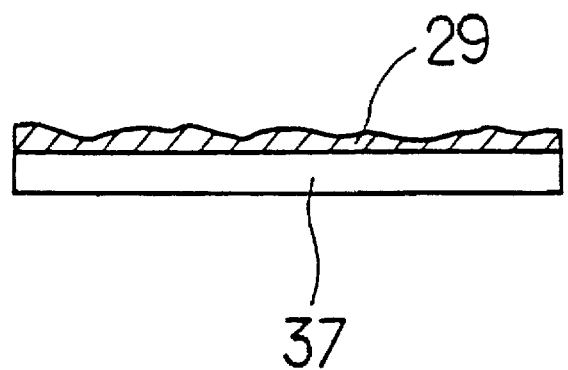
FIG. 32 is a view indicating the condition where a photosensitive agent has been directly coated onto a transfer film.
Figure 33:
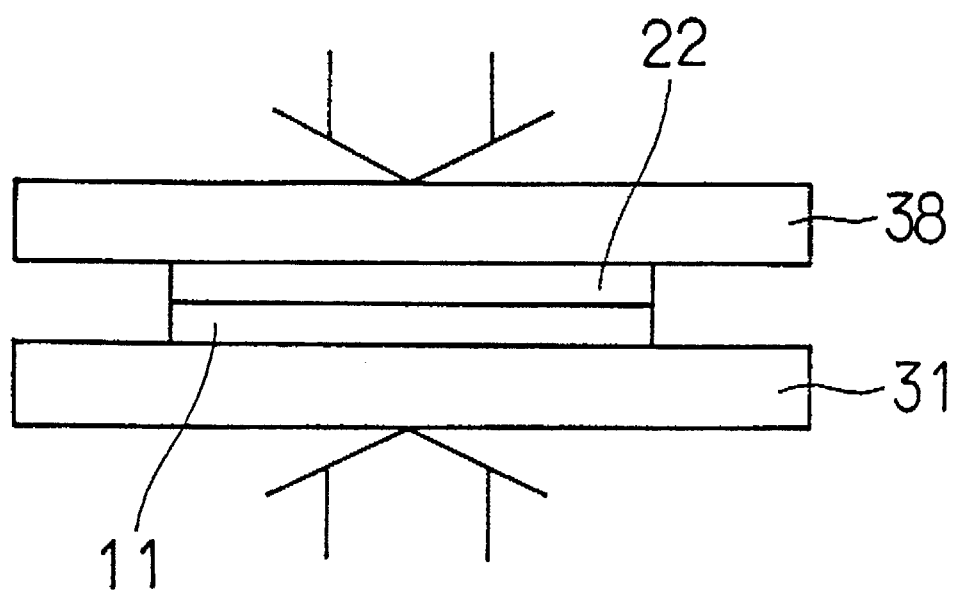
FIG. 33 is a view indicating the way of heating and pressing the hologram layer in the seventh embodiment of the present invention.

FIG. 32 is referred to. If a photosensitive agent 29 is directly coated onto the surface of a transfer film 37 as

TABLE 1

| Sample No. | Material of Adhesive | Maker | Trade No. | Type | Curing Method |
| --- | --- | --- | --- | --- | --- |
| 1 | Modified Acrylate Adhesive | Loctite | FMP-207 | One-liquid Type | UV curing |
| 2 | Modified Acrylate Adhesive | Loctite | LP-47 | One-liquid Type | UV curing |
| 3 | Epoxy Adhesive | Three Bonds | 3103 | One-liquid Type | UV curing |
| 4 | Epoxy Adhesive | Three Bonds | 3112 | One-liquid Type | UV curing |
| 5 | Epoxy Adhesive | Three Bonds | 3013B | One-liquid Type | UV curing |

Precisely, a substrate glass 31 to be the support plate and an ultraviolet-curing adhesive (e.g., modified acrylate adhesives, ultraviolet-curing epoxy adhesives, etc.) are first heated up to 80° C. This heating is intended to lower the viscosity of the adhesive from 960 cp (at 25° C.) to 200 cp. The adhesive thus heated to have such a lowered viscosity can easily be coated onto the substrate glass 31.

Then, the adhesive 12 is uniformly coated onto the substrate glass 31. Specifically, 16 cc of the adhesive are placed dropwise onto the substrate glass 31, and a spinner is rotated thereover at 2500 rpm for 40 seconds. Thus, the adhesive 12 is uniformly coated onto the substrate glass at a thickness of from 6 μm to 7 μm.

Afterwards, the thus-coated ultraviolet-curing adhesive 12 is treated to make it sticky. In this embodiment, 10 J/cm$^2$ illustrated, the agent 29 becomes uneven on the film 37. If the thus-coated transfer film is used as it is, the characteristics of the hologram film to be formed are not good.

This embodiment is intended to overcome the problem, in which a hydrophilic coat film is formed on the surface of a transfer film, a photosensitive agent is dropped onto the surface of said hydrophilic coat film whereupon the contact angle between said photosensitive agent and the surface of said hydrophilic coat film is θ, said photosensitive agent is uniformly coated onto the surface of said hydrophilic coat film and is processed to have holographic interference fringes, thereby obtaining a hologram layer, and thereafter said hologram layer is stuck onto a support plate to finally obtain an optical member, and in which the contact angle θ between the dropped photosensitive agent and the surface of the hydrophilic coat film is from 0.1° to 90°.

If the contact angle θ between the dropped photosensitive agent and the surface of the hydrophilic coat film is less than 0.1° or if it is more than 90°, it is difficult to uniformly coat the photosensitive agent onto the surface of the hydrophilic coat film. If so, in addition, it is difficult to desirably control the adhesion strength between the hologram layer made from the photosensitive agent and the transfer film.

Figure 21:
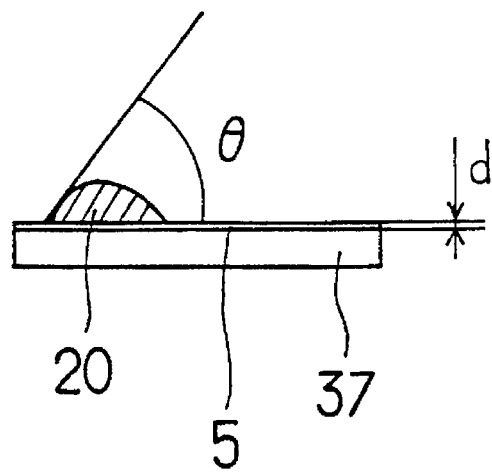
FIG. 21 is an explanatory view illustrating the contact angle θ between the dropped photosensitive agent and the surface of a transfer film coated with a hydrophilic coat film, in the process of producing the optical member of the sixth embodiment of the present invention.
Figure 22:
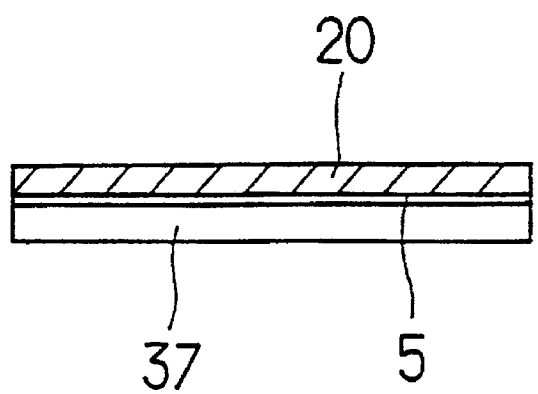
FIG. 22 is an explanatory view illustrating the photosensitive agent coated uniformly in the sixth embodiment.

Specifically, in FIG. 21 and FIG. 22, a photosensitive agent 20 is coated onto the surface of a transfer film 37 via a hydrophilic coat film 5 having a thickness of d, as illustrated. As shown in FIG. 20, the contact angle between the dropwise added photosensitive agent 20 and the surface of the hydrophilic coat film 5 is θ. As shown in FIG. 22, the photosensitive agent 20 is uniformly coated onto the surface of the transfer film 37 via the hydrophilic coat film 5, and then this is exposed to be a hologram layer. Next, the optical sheet thus prepared is attached to a support plate, according to the same process as in any of the above-mentioned embodiments, to produce an optical member 94 shown in FIG. 31. Said optical member 94 is composed of the support plate 31, and the hologram layer 22 stuck on said support plate 31 via the optical adhesive 13.

As shown in FIG. 21, the contact angle θ between the surface of the hydrophilic coat film 5 and the photosensitive agent 20 falls between 16° and 24°. The hydrophilic coat film 5 is a silicone-type hydrophilic coat film. The thickness d of the hydrophilic coat film 5 falls between 50 Å and 900 Å. The transfer film 37 is a polycarbonate film. The photosensitive agent 20 is gelatin bichromate or the like.

The process of this embodiment is described in detail, with reference to FIG. 21 to FIG. 30.

First, a hydrophilic coat film is uniformly coated onto the surface of a transfer film 37, as shown in FIG. 23 to FIG. 26.

To coat said film, for example, any method of spraying, dipping, gap-coating, spin-coating or the like can be employed.

Figure 23:
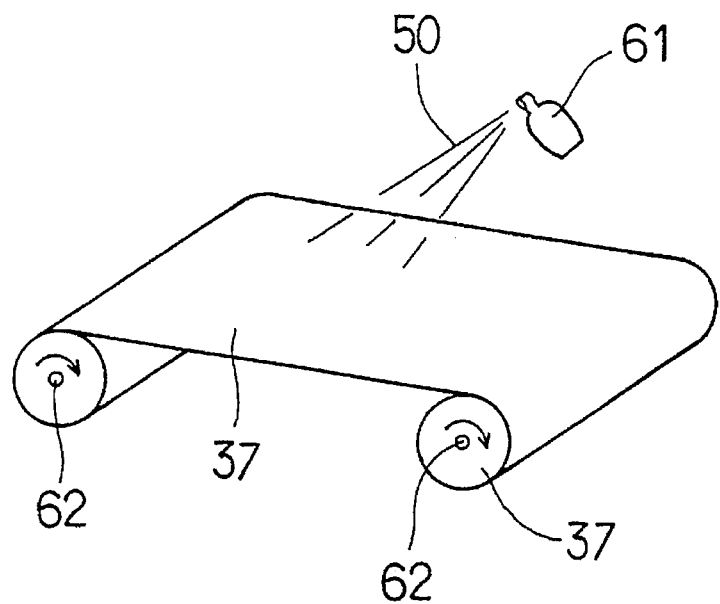
FIG. 23 is a view to explain a spraying method.
Figure 24:
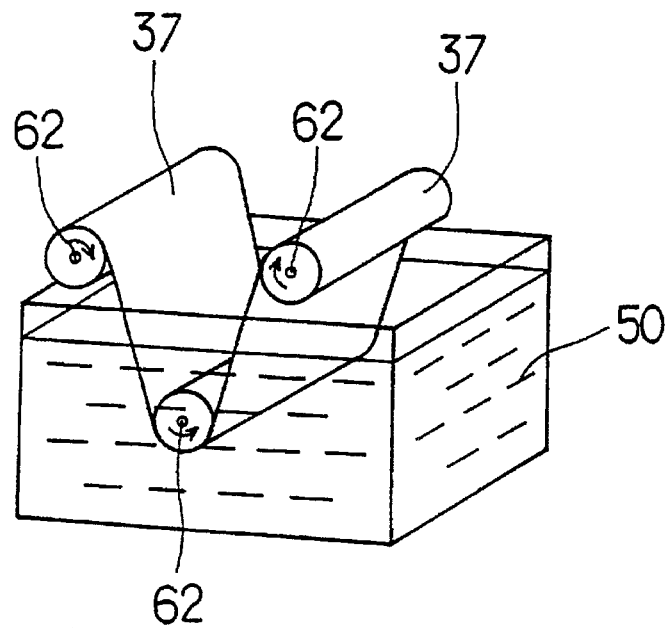
FIG. 24 is a view to explain a dipping method.
Figure 25:
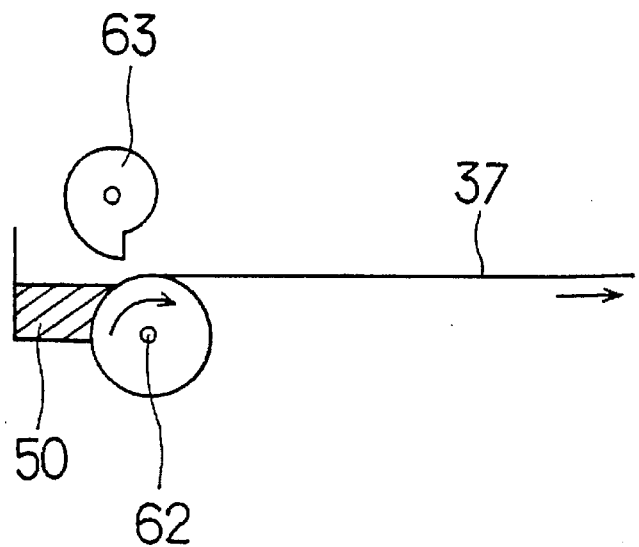
FIG. 25 is a view to explain a gap method.

The spraying method is such that a liquid hydrophilic agent 50 is continuously sprayed over the surface of the transfer film 37 that is being fed by rotary shafts 62, using a spray 61 (see FIG. 23).

The dipping method is such that the transfer film 37 that is being fed by the rotary shafts 62 is dipped in a liquid hydrophilic agent 50, while the thus-coated transfer film 37 is slowly wound up. In this way, the transfer film 37 is continuously coated with the agent 50 (see FIG. 24).

The gap-coating method is such that the transfer film 37 is passed through a liquid hydrophilic agent 50 by the rotation of a rotary shaft 62, while the excess hydrophilic agent 50 is removed by a gap 63. In this way, the transfer film 37 is continuously coated with the agent 50 (see FIG. 25).

Figure 26:
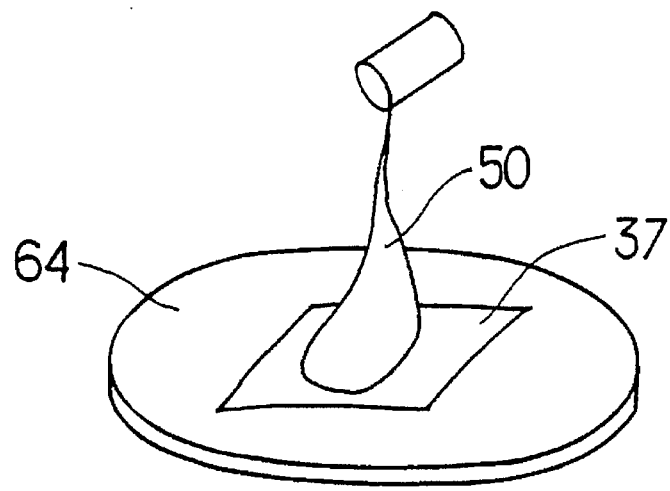
FIG. 26 is a view to explain a spin-coating method.

The spin-coating method is such that a transfer film 37 is mounted on a rotary stand 64, a hydrophilic agent 50 is dropped onto the surface of the transfer film 37, and then the stand 64 is rotated to form a uniform hydrophilic film on the film 37 (see FIG. 26).

Next, as shown in FIG. 21, a photosensitive agent 20 is placed dropwise onto the surface of the hydrophilic coat film 5 having a uniform thickness, through a messpipette. The contact angle θ between the photosensitive agent 20 and the surface of the hydrophilic coat film 5 falls between 16° and 24°.

Then, as shown in FIG. 22, the photosensitive agent 20 is uniformly coated onto the surface of the hydrophilic coat film 5, by a bar-code method. The bar-code method is a known method and is such that the dropped photosensitive agent is spread on the surface of the film 5 with a glass spatula having a triangular tip.

Figure 27:
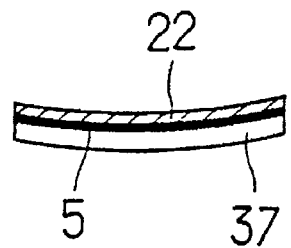
FIG. 27 through FIG. 31 are views illustrating the process for producing an optical member of the sixth embodiment.
Figure 28:
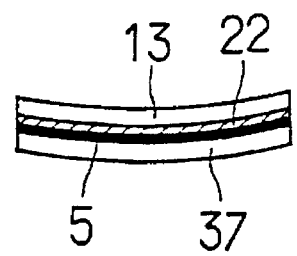

After that, the photosensitive agent 20 is exposed to form holographic interference fringes, thereby obtaining a hologram layer 22, as shown in FIG. 27. Next, as shown in FIG. 28, an optical adhesive 13 is uniformly coated onto the surface of the hologram layer 22. The optical adhesive is ultraviolet-curing FMD-207 that is available from Loctite Co.

Figure 29:
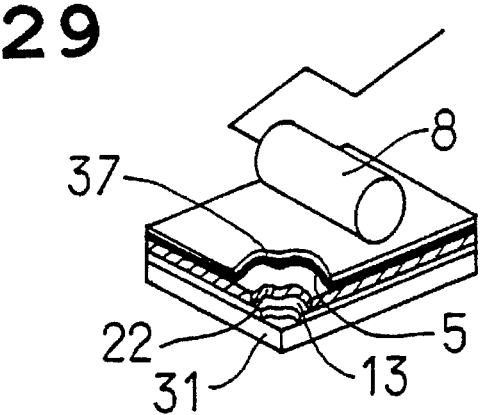

Next, as shown in FIG. 29, the hologram layer 22 is attached to a support plate 31 via the optical adhesive 13, and these are firmly stuck together, using a roller 8.

Figure 30:
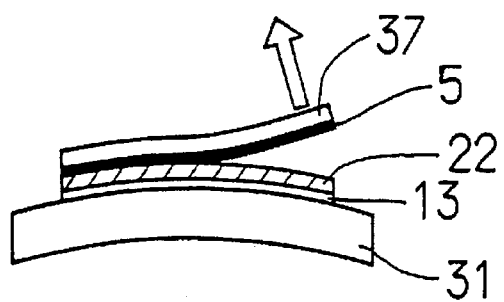
Figure 31:
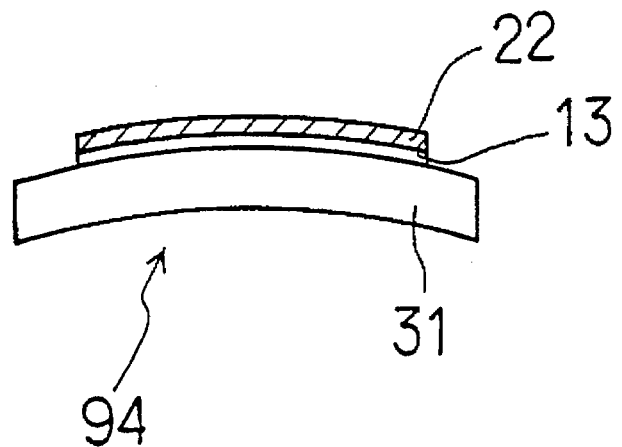

Thereafter, as shown in FIG. 30, the transfer film 37 is peeled along with the hydrophilic coat film 5. Accordingly, the intended optical member 94 is obtained, as shown in FIG. 31.

Afterwards, another plate (cover plate) may be stuck onto the surface of the hologram layer under pressure, in the same manner as in the first embodiment.

Next, the function and the effect of this embodiment will be described below.

In this embodiment, the hydrophilic coat film 5 is formed on the surface of the transfer film, prior to the coating of the photosensitive agent 20 onto the film 37, as shown in FIG. 21, and thereafter the photosensitive agent 20 is coated onto the film 5. Therefore, since the hydrophilic coat film 5 is well compatible with the photosensitive agent 20, and the photosensitive agent 20 can be uniformly coated onto the surface of the hydrophilic coat film 5. Accordingly, it is possible to produce the optical member 94 having excellent holographic characteristics.

In this embodiment, the photosensitive agent 20 is placed dropwise onto the surface of the hydrophilic coat film 5 in such a way that the contact angle between the agent 20 and the surface of the film 5 falls within the above-defined range (from 16° to 24°). Therefore, the adhesion strength between the hologram layer 22 and the transfer film 37 is so high that the peeling of the layer 22 from the transfer film 37 during the production of the optical member 94 can be prevented.

Next, the relationship between the contact angle θ between the surface of the hydrophilic coat film and the photosensitive agent coated thereon, and the adhesion strength was investigated. The results are shown in Table 2.

TABLE 2

| Contact Angle θ | Peeling | | Thickness of Hydrophilic Coat Film, d (Å) |
| --- | --- | --- | --- |
| 90° | Coating of the photosensitive agent was impossible. | | — |
| 50° | Coating of the photosensitive agent was impossible, but the coated layer was easily peeled in the subsequent process. | | — |
| 24° | Peelable | (weak adhesion) | 900 |
| 22° | Peelable | (weak adhesion) | — |
| 16° | Peelable | (weak adhesion) | 50 |
| 10° | Not peelable | (strong adhesion) | — |

From this table, it is known that, when the contact angle fell between 16° and 24°, the adhesion strength between the hologram layer and the transfer film was not problematic in terms of the production of the optical member and the transfer film could be peeled off of the hologram layer. However, when the contact angle was about 10°, the hologram layer was stuck too firmly onto the transfer film with the result in that the peeling of the transfer film from the hologram layer after the lamination process was difficult.

When the contact angle was 90°, the photosensitive agent could not be coated uniformly onto the surface of the hydrophilic coat film.

When the contact angle θ was 24°, the thickness of the hydrophilic coat film 5 was about 900 Å. When the contact angle θ was 16°, the thickness of the hydrophilic coat film 5 was about 50 Å.

From this, it is known that when the contact angle falls between 16° and 24°, the peeling of the transfer film is easy after the lamination process, but when it falls between 0.1° and 16°, the peeling of the transfer film is difficult after the lamination process. In addition, it is also known that when the contact angle is 24° or smaller, the photographic agent can be coated uniformly. Even though the contact angle θ is larger than 24°, the photographic agent can be coated onto the surface of the transfer film. In this case, however, the adhesion strength between the hydrophilic coat film and the hologram layer formed thereon is so small, that the hologram layer is easily peeled from the film during the subsequent process, for example, during the development process, etc.

The following embodiments are to demonstrate the improvement in the production of laminate glass articles under pressure, for example, by sealing an optical sheet in a windshield glass according to the method of the present invention.

Seventh Embodiment

In the method for producing the optical member of this embodiment, an optical sheet, hologram layer 22 is treated under heat and pressure before a cover plate is stuck onto the surface of the layer 22 under pressure.

The hologram layer 22 is stuck onto the surface of a support plate 31 via an optical adhesive 11 by any of the lamination methods referred to in the above-mentioned embodiments.

To treat the hologram layer 22 under heat and pressure, a glass plate 38 is put on the surface of the layer 22, and the layer 22 is pressed between the support plate 31 and the glass plate 38 under pressure at 14 kg/cm² and under heat at 130° C., for 60 minutes. Afterwards, the glass plate 38 is removed, and the hologram layer 22 is stuck onto a cover plate 39 using a surface adhesive 19 (see FIG. 7) to produce an optical member.

Next, the function and the effect of this embodiment will be described below.

According to the method for producing the optical member of this embodiment, the above-mentioned hot pressure treatment is conducted prior to the pressure adhesion of the hologram layer 22 or, that is, the sealing of the same, by which the hologram layer 22 is subjected to severe conditions. Therefore, the subsequent pressure adhesion of the cover plate to the hologram layer 22 does not cause the change in the holographic characteristics of the layer 22 with the result that the durability of the optical member thus produced according to this embodiment is improved.

Next, the influence of the hot pressure treatment on the regeneration wavelength of the hologram layer was measured.

Specifically, the regeneration wavelength of the hologram layer before being subjected to the hot pressure treatment and that of the hologram layer after having been subjected to the hot pressure treatment followed by pressure adhesion of the layer to the cover plate were measured. The hot pressure treatment was conducted at 14 kg/cm² and at 130° C. The pressure adhesion was conducted at 14 kg/cm² and at 130° C. The hologram film, the optical adhesive and the support plate used herein are the same as those in the seventh embodiment. The results are shown in FIG. 34.

Figure 35:
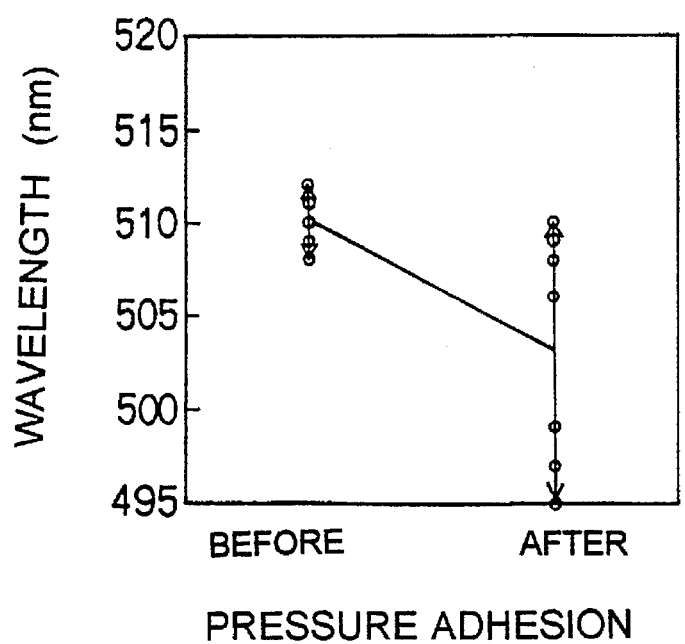
FIG. 35 is a graph showing the regeneration wavelength of the hologram layer that has not been subjected to the hot pressure treatment, before and after its lamination under pressure.

For comparison, the hologram film was stuck onto the cover plate under pressure, without being subjected to the above-mentioned hot pressure treatment, and the regeneration wavelength of the hologram layer was measured in the same manner as above. The results are shown in FIG. 35.

Figure 34:
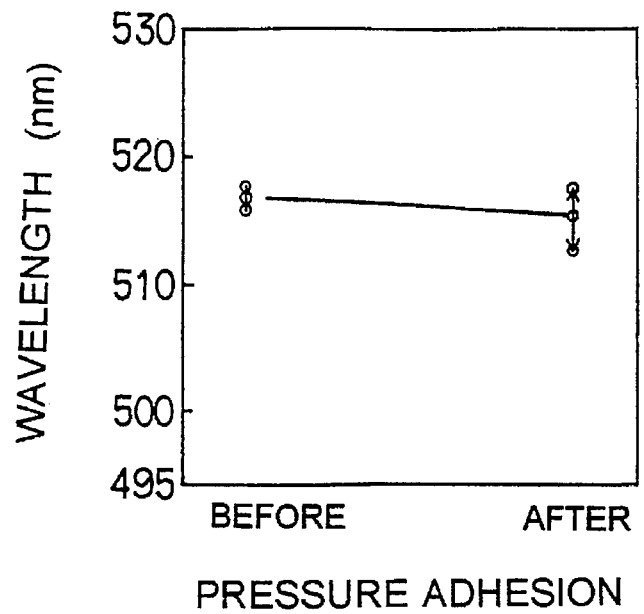
FIG. 34 is a graph showing the regeneration wavelength of the hologram layer that has been subjected to the hot pressure treatment, before and after its lamination under pressure.

As is known from FIG. 34, there was almost no change in the regeneration wavelength of the hologram layer before and after the pressure adhesion. It is also known that the dispersion of the regeneration wavelength of the hologram layer after the pressure adhesion was small.

As opposed to this, the regeneration wavelength of the hologram layer that had not been subjected to the hot pressure treatment before being stuck onto the cover plate under pressure became shortened after the pressure adhesion of the layer to the cover plate, and the dispersion of the regeneration wavelength of the hologram layer after the pressure adhesion was large.

From this, it is known that the hot pressure treatment of the hologram layer before the pressure adhesion thereof to the cover plate is effective in preventing the variation in the regeneration wavelength of the hologram layer before and after the pressure adhesion of the layer to the cover plate and also in preventing the dispersion of the regeneration wavelength of the layer after the pressure adhesion thereof to the cover plate.

The hot pressure treatment of the hologram layer is conducted before the pressure adhesion of the layer to the cover plate. This treatment may be conducted at any time before the pressure adhesion, but it is preferably conducted before the lamination of the cover plate onto the hologram layer.

The hot pressure treatment of the hologram layer is preferably conducted at 1.0 kg/cm² or higher and at 80° C. or higher. In particular, when a polyvinyl butyral plate is used as the cover plate to be laminated onto the hologram layer, it is desired that the hot pressure treatment of the hologram layer is conducted under more severe conditions than those for the pressure adhesion of the cover plate to the hologram layer which is conducted at 10 kg/cm² or higher and at 125° C. or higher. In this case, if the hot pressure treatment of the hologram layer is conducted at a pressure of lower than 10.0 kg/cm² and at a temperature of lower than 125° C., the holographic characteristics of the hologram layer will be changed by the pressure adhesion of the layer to the cover plate, often resulting in the dispersion of the regeneration wavelength of the hologram layer onto which the cover layer has been laminated under pressure.

The hot pressure treatment is preferably conducted at a pressure of between 1.0 kg/cm² and 20.0 kg/cm² and at a temperature of between 80° C. and 150° C. If the pressure for the treatment is higher than 20.0 kg/cm² or if the temperature for the same is higher than 150° C., the optical characteristics of the optical sheet will often be deteriorated.

It is preferred that the hot pressure treatment is conducted in such a condition that is influenced little by air (e.g., oxygen, etc.). Specifically, the hot pressure treatment is preferably conducted in a closed system. In such a closed system, the hologram layer is not brought into contact with fresh oxygen, etc. during the hot pressure treatment of the layer, with the result that the hologram layer is hardly oxidized and yellowed. Therefore, the thus-treated hologram layer may have excellent holographic characteristics.

Eighth Embodiment

This embodiment is to demonstrate the production of a hologram-sealed glass (optical member), with reference to FIG. 36 to FIG. 48.

Figure 36:
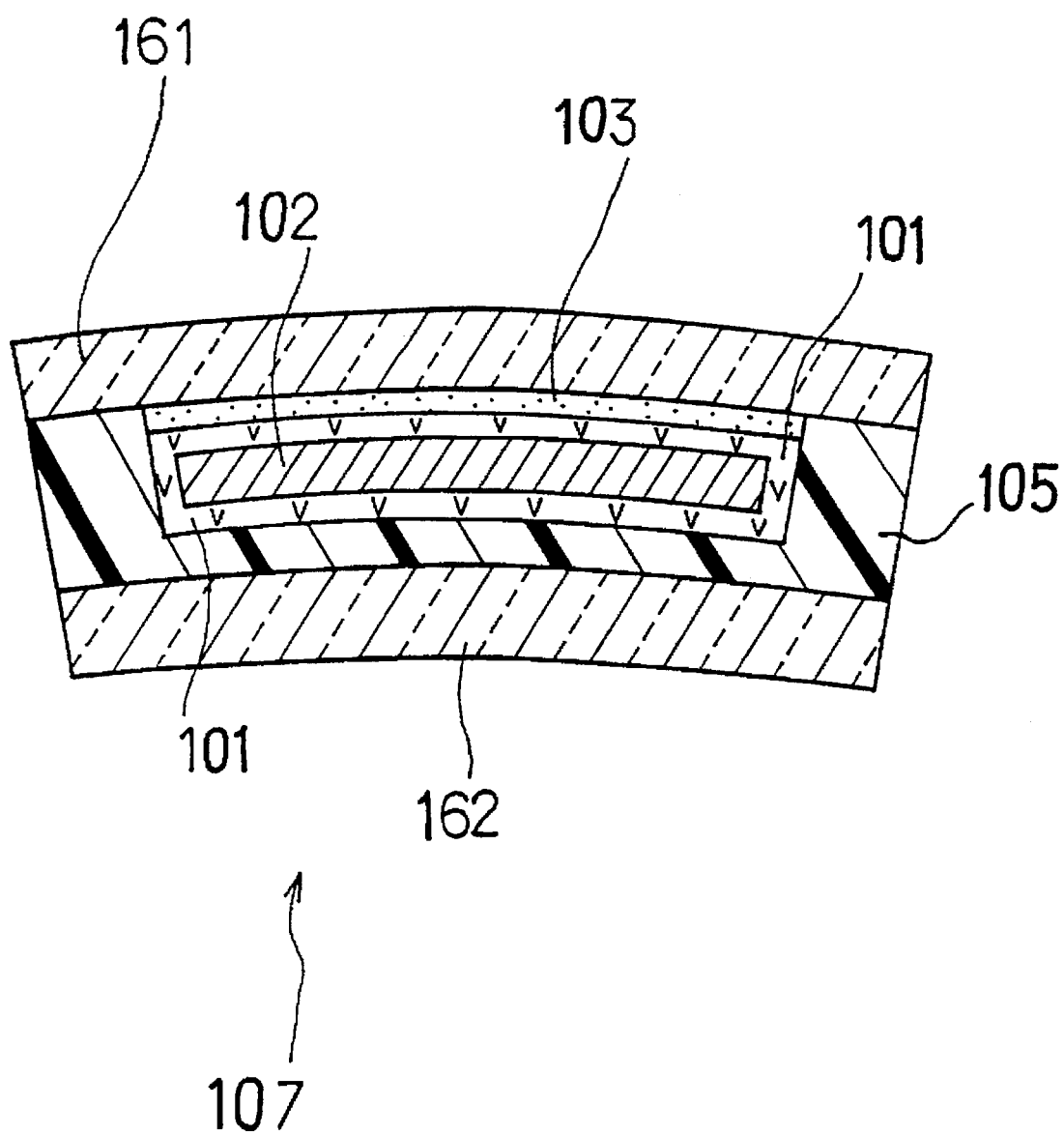
FIG. 36 is a constitutional view illustrating the cross section of a hologram-sealed glass of the eighth embodiment of the present invention.
Figure 37:
FIG. 37 through FIG. 48 are cross sectional views showing the process for producing the hologram-sealed glass of FIG. 36.

In FIG. 36, a hologram-sealed glass 107 of this embodiment has a hologram 102 that has been sealed between a first glass (support plate) 161 and a second glass (cover plate) 162. The hologram 102 is completely wrapped up in a moisture-proof layer 101 in order to protect it from the penetration of moisture.

The moisture-proof layer 101 is formed by coating a moisture-proofing agent over the hologram 102, and this has no optical rotatory power. As the moisture-proofing agent, used are polyolefinic synthetic resins such as polyolefins, polypropylene, etc., as well as acrylic synthetic resins, rubber resins, fluorine resins, epoxy synthetic resins, etc. These are formed into thin films without being stretched and are used to wrap up the hologram 102 therein. Polymethylpentene, polypropylene, etc., may be used as the polyolefinic synthetic resins. Butyl rubber, nitrile rubber, acrylic rubber, butadiene rubber, silicone rubber, etc. may be used as the rubber resins.

The hologram 102 wrapped up in the above-mentioned moisture-proof layer 101 is stuck onto the first glass 161 via an adhesive layer 103. The hologram 102 is sealed between the first glass 161 and the second glass 162 via a surface adhesive 105 applied therebetween. The first glass 161 and the second glass 162 each are a gently curved window glass.

The surface adhesive 105 is a polyvinyl butyral resin. The adhesive layer 103 is made of an ultraviolet-curing adhesive (FMD207 available from Nippon Loctite Co., or 3013B available from Three Bonds Co.).

The hologram-sealed glass 107 is used in a head-up display for cars.

Next, the process for producing the above-mentioned hologram-sealed glass 107 will be described hereinunder, with reference to FIG. 37 to FIG. 48.

Figure 38:
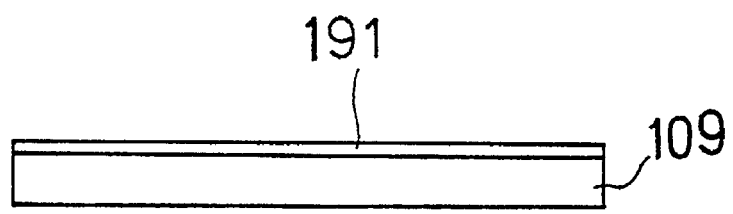
Figure 39:
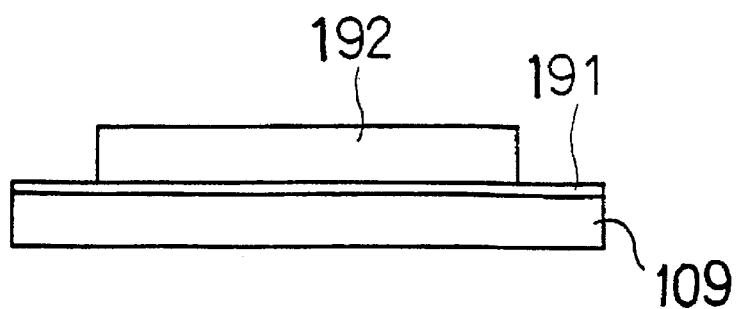

First, an exposable glass (fixed substrate) 109 is washed with ethanol or the like (see FIG. 37), and its surface is coated with an exposable adhesive (ultraviolet-curing adhesive, or gelatin (6 wt. %)) 191 (see FIG. 38). Next, as shown in FIG. 39, a base film 192 to be a transfer film is stuck onto the surface of the exposable adhesive 191. This base film 192 may be made of a polycarbonate, polyethylene, polyethylene terephthalate or the like. It is desired that the refractive index of the base film 192 is similar to that of the hologram 102, preferably falling within the range of 1.52±0.04.

Figure 40:
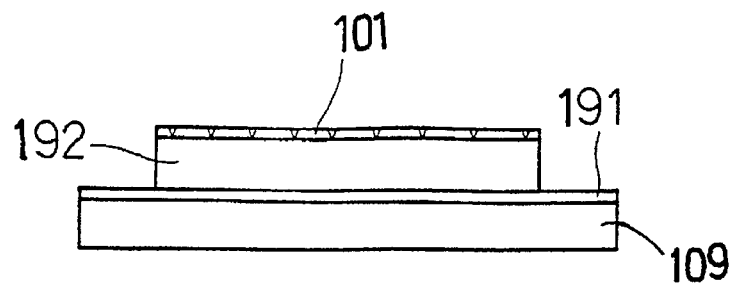

Next, as shown in FIG. 40, the surface of the base film 192 is coated with a moisture-proofing agent selected from, for example, rubber resins (Humiseal 1B51 available from Chase Corporation), polyolefinic synthetic resins such as polypropylene, etc., acrylic synthetic resins, epoxy synthetic resins, etc., to form a moisture-proof layer 101 on the film 192. To coat this, a spin-coating method, a dip coating method, a bar-coating method or the like can be employed.

Figure 41:
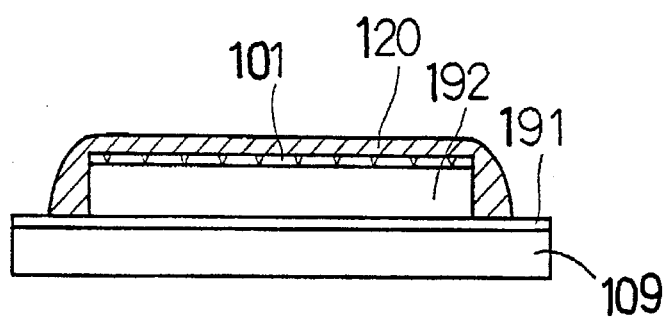

Next, as shown in FIG. 41, a photosensitive material is coated all over the base film 192 including the moisture-proof layer 101 to form a photosensitive film 120 thereon. The photosensitive material used herein is a color-sensitized gelatin bichromate. Apart from this, the material may also be any of gelatin bichromate, photopolymers and silver-salt-type photosensitive materials.

Then, the thus-formed photosensitive film 120 is exposed to laser rays and then developed to form a hologram 102.

Figure 42:
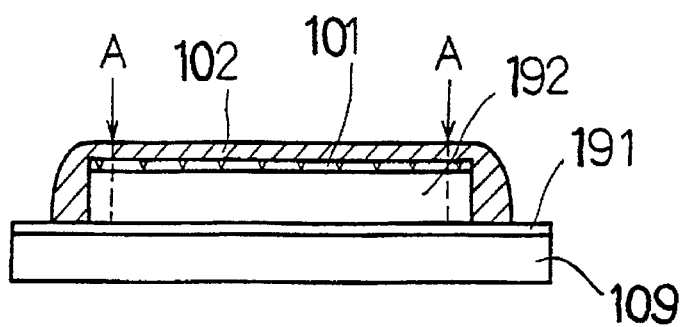
Figure 43:
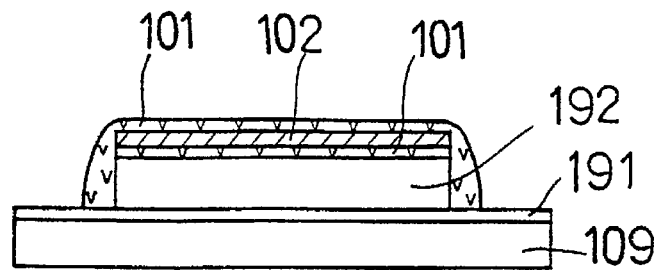

After that, as shown in FIG. 42, the edges of the hologram 102 are cut off, along the A-A line illustrated, to obtain a desired size. Next, as shown in FIG. 43, the surface of the hologram 102 is coated with the same moisture-proofing agent as that mentioned hereinabove to form an additional moisture-proof layer 101 thereon. The moisture-proof layer 101 shall completely cover the whole surface of the hologram 102 including its edges.

However, if the penetration of water into the hologram from its edges during the final sealing step is negligible and if the complete coating of the whole surface of the hologram is unnecessary, partial coating of the hologram with the moisture-proof layer is acceptable while partly exposing the hologram.

Figure 44:
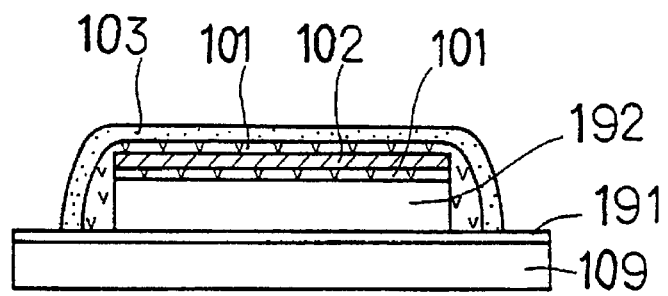

Next, as shown in FIG. 44, an ultraviolet-curing adhesive layer 103 is formed on the surface of the moisture-proof layer 101, like in the above-mentioned first embodiment. Afterwards, this is heated or exposed to ultraviolet rays whereby the adhesive layer 103 is made sticky.

Figure 45:
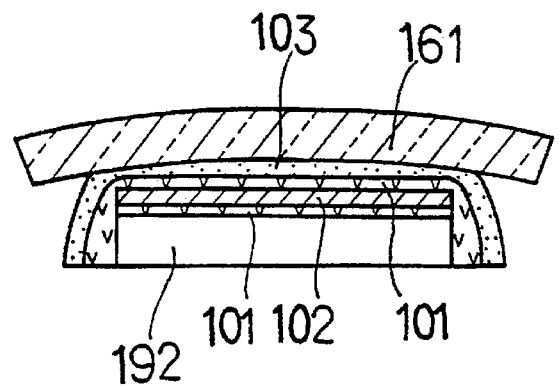

Then, the hologram 102 with the base film 192 is peeled from the exposable glass 109, and a first glass 161 is attached to the surface of the adhesive layer 103, as shown in FIG. 45. Next, the adhesive layer 103 is cured by irradiating ultraviolet rays thereto, whereby the hologram 102 is stuck and fixed onto the surface of the first glass 161.

Figure 46:
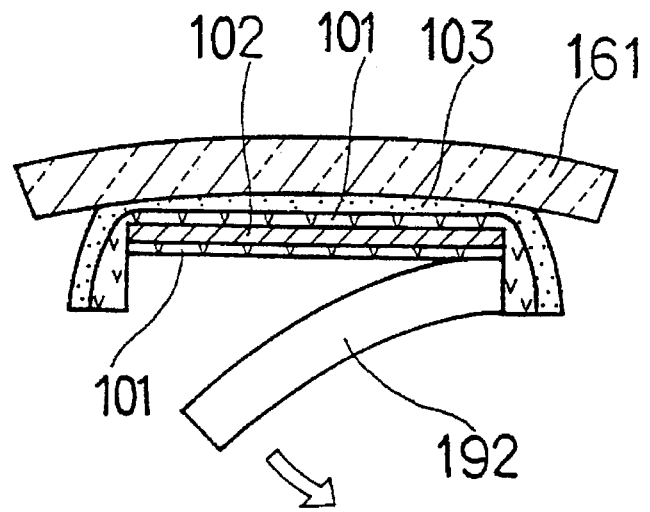

Thereafter, as shown in FIG. 46, the base film 192 is peeled from the hologram 102.

Figure 47:
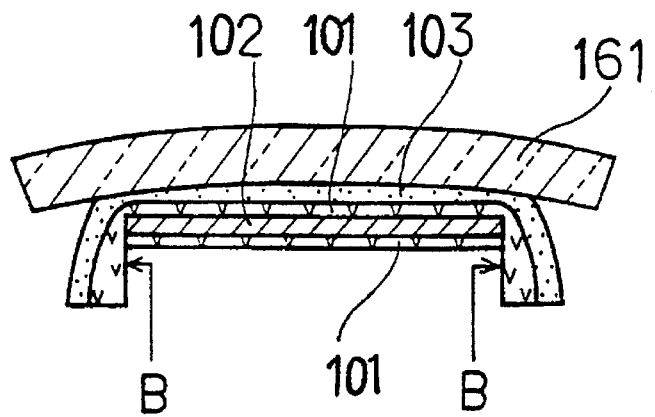

Next, as shown in FIG. 47, the edges of the moisture-proof layer 101 are cut off along the B-B line illustrated. After thus cut, the whole surface of the hologram 102 shall be still coated with the moisture-proof layer 101.

Figure 48:
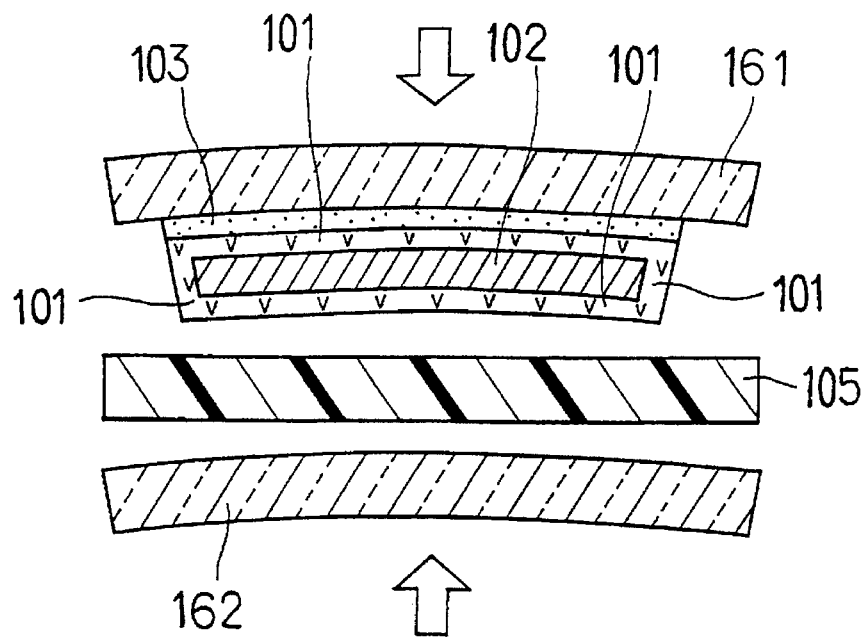

After that, as shown in FIG. 48, a second glass 162 is laminated over the first glass 161 using a surface adhesive 105 of a polyvinyl butyral resin, whereby the hologram 102 is sandwiched between these. Next, this is heated under pressure at 130° C. and at 13 atmospheres for 30 minutes. By this hot pressure treatment, the polyvinyl butyral resin is melted and the hologram 102 is sealed between the first glass 161 and the second glass 162 to give the hologram-sealed glass 107 shown in FIG. 36.

Next, the function and the effect of this embodiment will be described below.

In the hologram-sealed glass 107 of this embodiment, as shown in FIG. 36, the whole surface of the hologram 102 is covered with the moisture-proof layer 101 which prevents the penetration of moisture into the hologram 102. Therefore, the hologram 102 is protected from moisture.

Even if the hologram 102 is exposed to a wet atmosphere, for example, during the sealing step to be conducted at high temperatures and high pressures, the moisture-proof layer 101 that wraps the hologram 102 prevents the penetration of moisture into the hologram 102. Therefore, the hologram 102 is not damaged by moisture.

Accordingly, the hologram 102 can maintain its high diffraction efficiency during and even after the sealing step.

For these reasons, the hologram-sealed glass 107 exhibits a high diffraction efficiency. The image to be displayed by the hologram is not distorted. Using the hologram-sealed glass 107 of this embodiment, therefore, sharp images can be reproduced.

To protect a hologram from moisture, it may be considered to previously coat the photosensitive film with a plastic film. However, this has the following problem. The plastic film is formed by stretching a softened plastic with the result that the thus-formed plastic film is to have optical rotatory power. Therefore, if the plastic film is stuck onto a hologram and the hologram is exposed to form interference fringes, this film causes the decrease in the contrast of the interference fringes formed, thus lowering the diffraction efficiency of the hologram.

In this embodiment, the hologram 102 coated with the moisture-proof layer 101 can be protected from moisture even though it is not coated with such a plastic film. Therefore, the hologram-sealed glass 107 of this embodiment, since it does have a plastic film therein, is free from the influence of the optical rotatory power of a plastic film. Accordingly, the hologram 102 in this embodiment can maintain a high contrast of interference fringes to be formed therein. Thus, the hologram-sealed glass 107 of this embodiment has a high diffraction efficiency.

In the method for producing the hologram-sealed glass of this embodiment, the photosensitive film 120 is coated with the moisture-proof layer having no optical rotatory power, as shown in FIG. 41, and thereafter this is exposed to layer rays. Thus, the layer rays may pass through the layer or may reflect on the layer always in a constant direction so that high-contrast interference fringes may be recorded in the film 120. The thus-exposed photosensitive film is developed to form the hologram 102 having a high diffraction efficiency.

As shown in FIG. 48, the whole surface of the hologram 102 is completely coated with the moisture-proof layer 101 during the sealing step. Therefore, the hologram 102 can maintain its high diffraction efficiency even under the conditions of high temperature and high pressure in the sealing step. For these reasons, the hologram-sealed glass having such a high diffraction efficiency can be produced stably according to the process of this embodiment.

Ninth Embodiment

Figure 49:
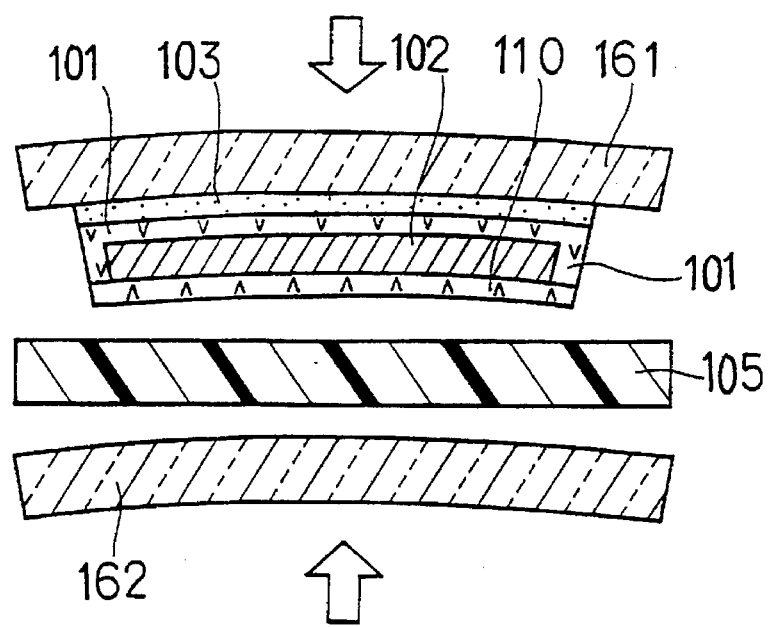
FIG. 49 is an explanatory view showing the sealing step in the process of producing a hologram-sealed glass of the ninth embodiment of the present invention.

A hologram-sealed glass of this embodiment is shown in FIG. 49, in which one surface of the hologram 102 is coated with a moisture-proof film 110 while the other surface thereof is coated with the same moisture-proof layer 101 as that in the above-mentioned eighth embodiment.

This hologram 102 is stuck onto the first glass 161 via the ultraviolet-curing adhesive 103. This hologram 102 is sealed between the first glass 161 and the second glass 162 via the optical surface adhesive 105.

This embodiment can be realized by sticking the moisture-proof film 110 onto one surface of the base film 192 in a step corresponding to the step of the above-mentioned FIG. 39. The moisture-proof film 110 has no optical rotatory power, which is filmed without imparting any stress thereto.

The moisture-proof film 110 may be made of any polyvinyl-chloride-type synthetic resin such as polyvinyl chloride, polyvinylidene chloride, etc., polyolefinic synthetic resin such as polyolefins, polymethylpentene, etc.

The other constitutions in this embodiment are the same as those in the eighth embodiment.

Next, the function and the effect of this embodiment will be described below.

In this embodiment, one side of the hologram 102 is coated with the moisture-proof film 110 stuck thereonto while the other side thereof is coated with the moisture-proof layer 101 formed thereon by coating, as shown in FIG. 49. Both the moisture-proof film 110 and the moisture-proof layer 101 prevent the penetration of moisture into the hologram 102, while having no optical rotatory power. Therefore, the hologram-sealed glass produced in this embodiment has excellent moisture-proofness and has a high diffraction efficiency, like that produced in the eighth embodiment.

Tenth Embodiment

Figure 50:
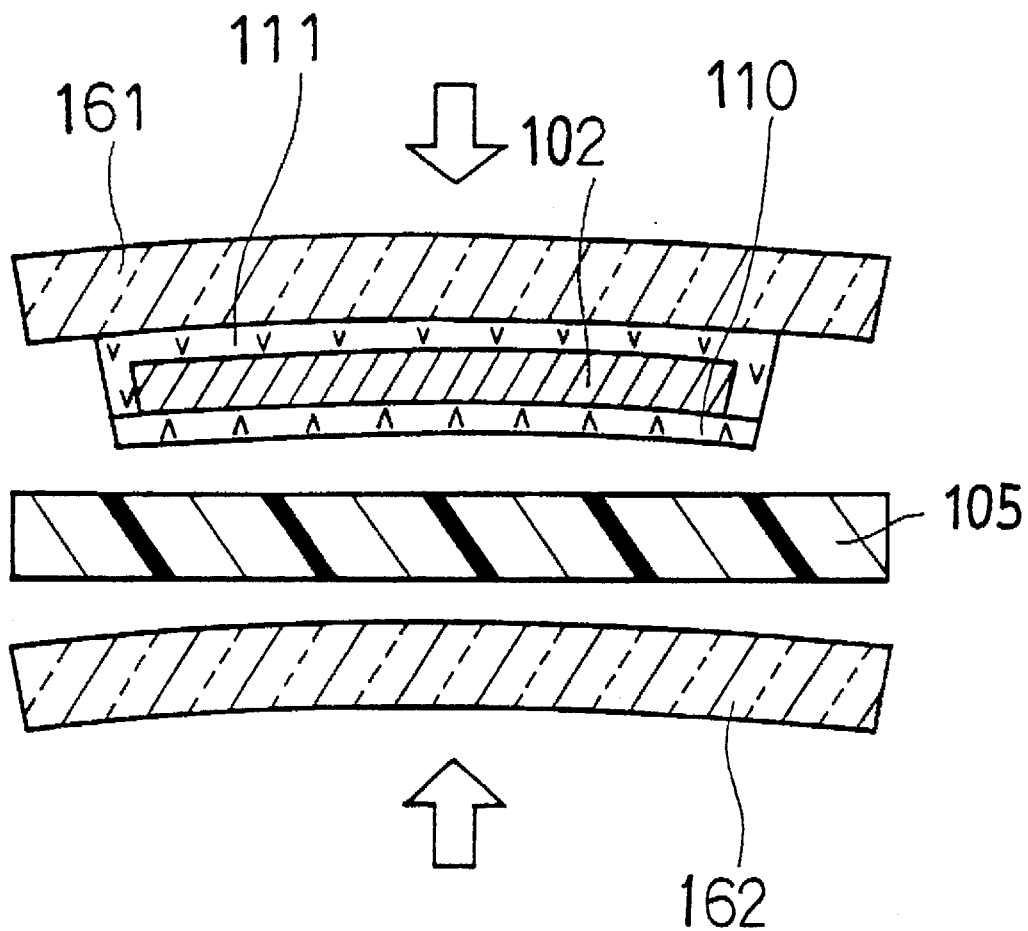
FIG. 50 is an explanatory view showing the sealing step in the process of producing a hologram-sealed glass of the tenth embodiment of the present invention.

FIG. 50 shows a hologram-sealed glass of this embodiment, in which the moisture-proof layer 111 is made of an adhesive material. The adhesive material may be an ultraviolet-curing adhesive such as that used in the above-mentioned first embodiment. As shown in FIG. 50, the hologram 102 coated with the moisture-proof layer 111 is directly stuck and fixed onto the first glass 161. The moisture-proof layer 111 may be an ultraviolet-curing synthetic adhesive, such as 3013B available from Three Bonds Co.

The hologram 102 is sealed between the first glass 161 and the second glass 162 via the optical surface adhesive 105 of a polyvinyl butyral resin.

The other constitutions in this embodiment are the same as those in the ninth embodiment.

In this embodiment, the moisture-proof layer 111 itself is adhesive. Therefore, the hologram 102 can be stuck directly onto the first glass 161 without using any additional adhesive other than the moisture-proof layer, being different from the cases of the eighth and the ninth embodiments. Therefore, the process of this embodiment is simple.

The other constitutions in this embodiment are the same as those in the eighth embodiment.

Eleventh Embodiment

Figure 51:
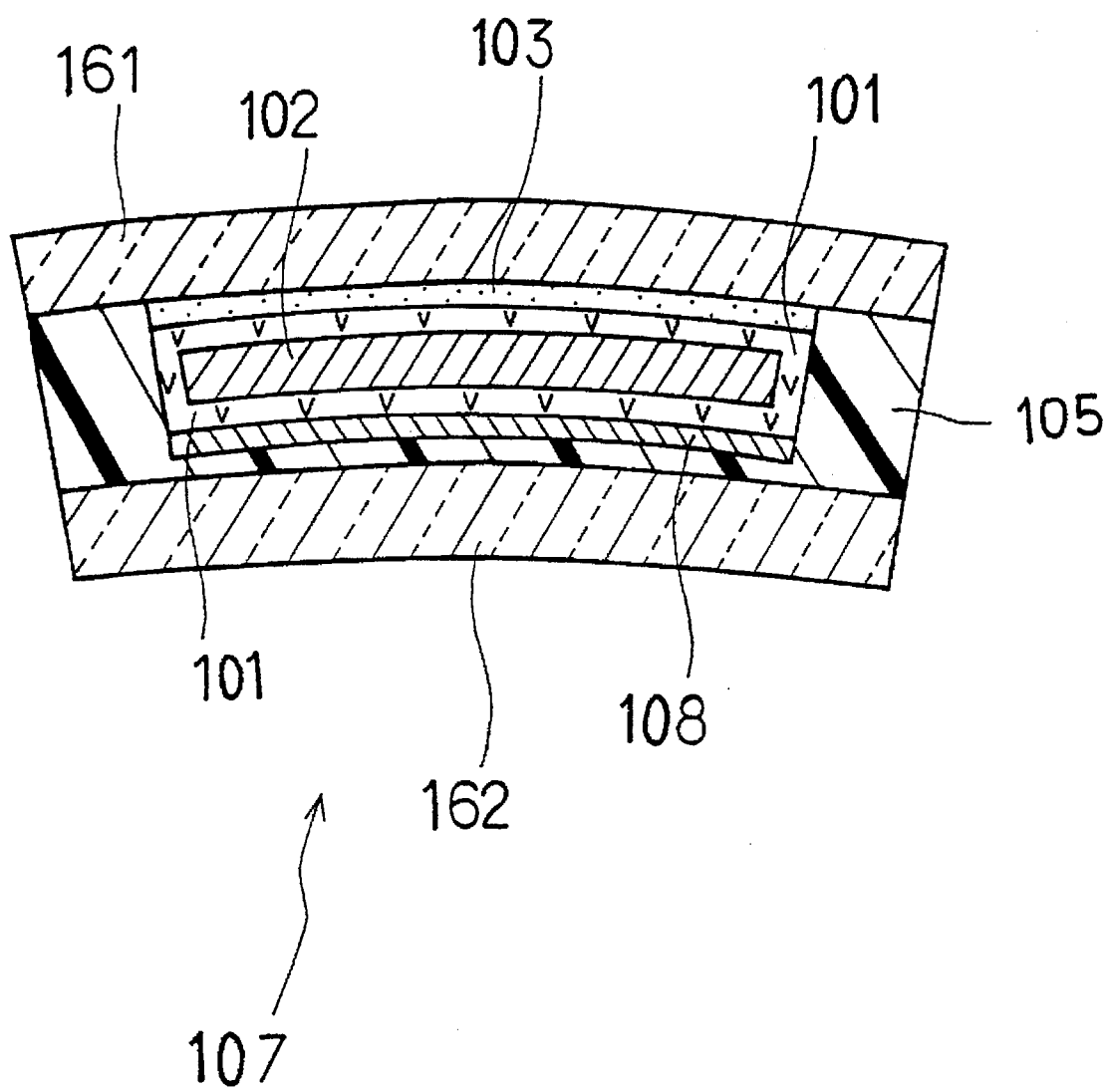
FIG. 51 is a constitutional, cross-sectional view illustrating a hologram-sealed glass of the eleventh embodiment of the present invention.

A hologram-sealed glass of this embodiment is shown in FIG. 51, in which an interlayer 108 is provided by coating between the moisture-proof layer 101 and the optical surface adhesive 105 so as to enhance the adhesion strength between them. The interlayer 108 may be made of, for example, cold-melting glass, gelatin or the same material as that of the moisture-proof layer. Even though the interlayer 108 is made of a hydrophilic material, the hologram 102 can be protected from moisture by the moisture-proof layer 101.

The other constitutions in this embodiment are the same as those in the ninth embodiment.

In this embodiment, the interlayer 108 is provided between the moisture-proof layer 101 and the optical adhesive 105 so as to enhance the adhesion strength between these. Thus, the hologram 102 is firmly stuck and fixed onto the optical adhesive 105.

Therefore, the hologram 102 can be securely sealed between the first glass 161 and the second glass 162.

In addition to this, this embodiment has the same effect as that of the eighth embodiment.

Twelfth Embodiment

Herein is investigated the acceptable optical rotatory power of the moisture-proof layer in the above-mentioned eighth to eleventh embodiments. In the same manner as mentioned above, a moisture-proof layer, a holographic photosensitive film and others are formed on a transfer film, and the resulting laminate is holographically exposed. In the holographic exposure, the reference ray, the objective ray or both penetrate(s) into the holographic photosensitive film, after having passed through the moisture-proof layer.

Naturally, the visibility of a hologram is proportional to the contrast of the interference fringes formed in the hologram or to the diffraction efficiency of the hologram. Therefore, the increase in the visibility depends on either the increase in the contrast of the interference fringes formed or the increase in the diffraction efficiency.

The present inventors have heretofore made the linear polarized rays of the reference ray and the objective ray that are introduced into a hologram, parallel to each other, in order to increase the contrast of the interference fringes to be formed in the hologram. However, the present inventors have found that, even through the linear polarized ray of the reference ray is made parallel to the linear polarized ray of the objective ray when the rays are introduced into a hologram, the contrast of the interference fringes to be formed cannot be satisfactorily increased since the moisture-proof layer itself which coats the hologram has an optical rotatory characteristic.

Figure 52:
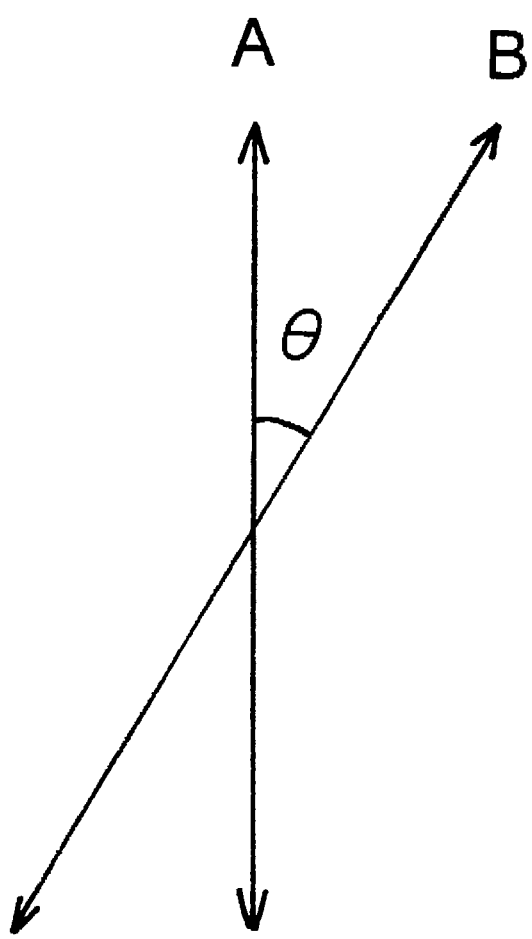
FIG. 52 is a view showing the angle (optical rotation) between the linear polarized ray of the reference ray that has passed through the moisture-proof layer and the linear polarized ray of the object ray that has passed through the moisture-proof layer, in the twelfth embodiment of the present invention.

In order to overcome this problem, the present inventors have found that the moisture-proof layer is preferably such that the difference (optical rotation) between the angle of the linear polarized ray A of the reference ray that has passed through the moisture-proof layer and that of the linear polarized ray B of the objective ray that has passed through the moisture-proof layer, as shown in FIG. 52, shall be smaller than a pre-determined value.

Figure 53:
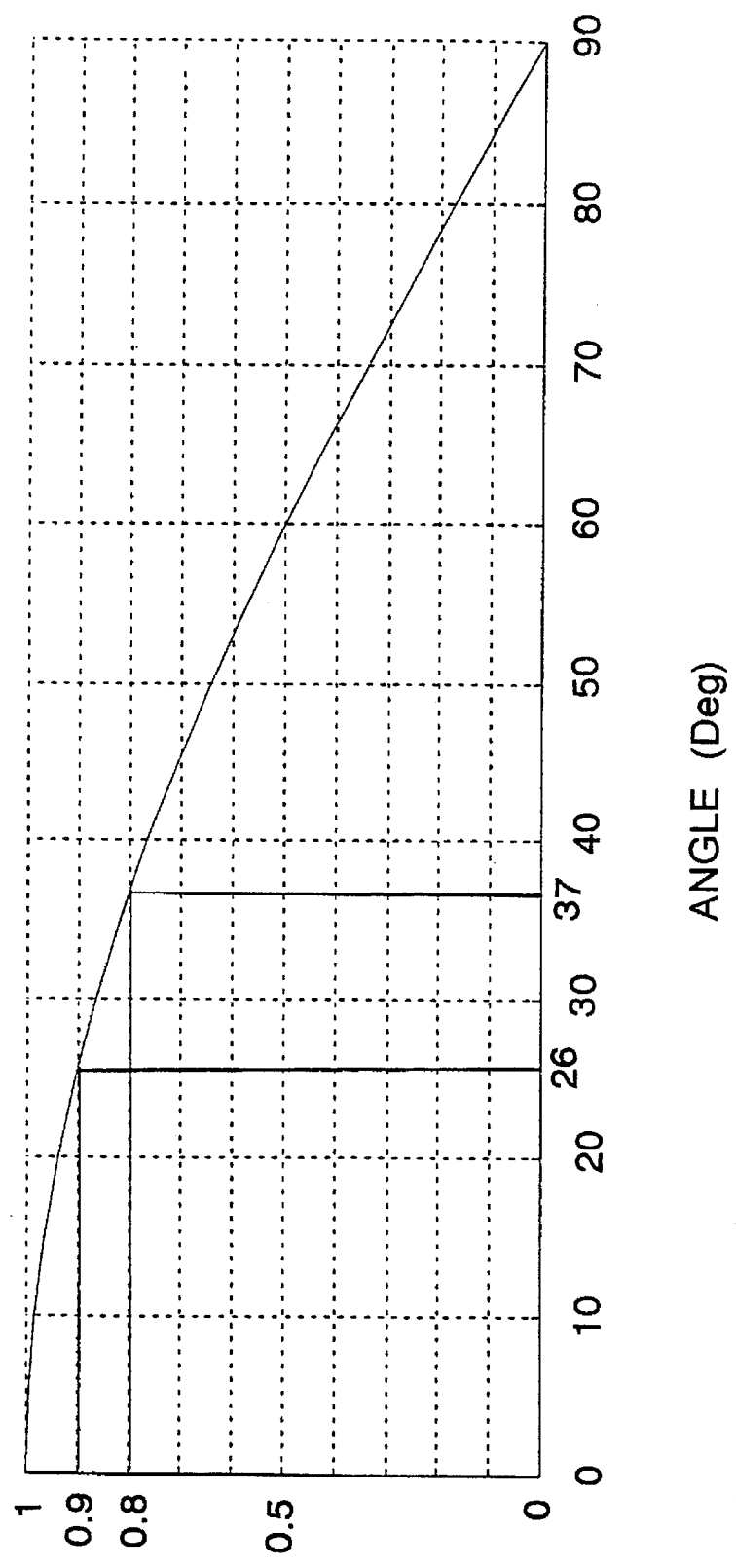
FIG. 53 is a graph illustrating the relationship between the angle (optical rotation) and the visibility.

FIG. 53 shows the relationship between the optical rotation and the visibility. As is obvious from this, the visibility may be 80% or more when the optical rotation is 37° or less and it may be 90% or more when the optical rotation is 26° or less.

From these data, it is known that the optical rotation of the moisture-proof layer is preferably 37° or less, more preferably 26° or less.

In the above-mentioned eighth to twelfth embodiments, it is preferred to treat the surface of the moisture-proof layer by corona-discharging treatment, plasma treatment, primer treatment or the like, prior to the pressure adhesion step or the transfer step. By such surface treatment, the surface of the moisture-proof layer is activated so that the adhesion strength between the layer and the first glass (support plate) or the second glass (cover plate) is improved.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for producing an optical holographic member, comprising the steps of:
   preparing an optical sheet which is a hologram layer having holographic interference fringes formed thereon;
   preparing a support plate;
   coating an ultraviolet-curing adhesive resin onto a surface of said support plate;
   causing a surface of said ultraviolet-curing adhesive resin coated onto said surface of said support plate to be sticky by irradiating said ultraviolet-curing adhesive resin with ultraviolet rays;
   placing said optical sheet on said support plate so that said hologram layer is stuck on said surface of said ultraviolet-curing adhesive resin which has been caused to be sticky; and
   curing said ultraviolet-curing adhesive resin irradiating said ultraviolet-curing adhesive resin with ultraviolet rays which are stronger than the ultraviolet rays used in the causing step after said hologram layer was stuck on said surface of said ultraviolet-curing adhesive resin coated on said surface of said support plate.

2. The method for producing an optical holographic member as claimed in claim 1, wherein said causing step includes the step of increasing the viscosity of said ultraviolet-curing adhesive resin by three times or more.

3. The method for producing an optical holographic member as claimed in claim 1, wherein said causing step includes the step of increasing the viscosity of said ultraviolet-curing adhesive resin by ten times or more.

4. A method for producing an optical holographic member, comprising the steps of:
   preparing a transfer film;
   forming a holographic photosensitive film on said transfer film;
   exposing and developing said holographic photosensitive film to make it into an optical sheet comprising a hologram having a holographic image;
   forming an ultraviolet-curing adhesive resin onto a surface of said optical sheet;
   causing a surface of said ultraviolet-curing adhesive resin formed on said surface of said optical sheet to be sticky by irradiating said ultraviolet-curing adhesive resin with ultraviolet rays;
   sticking said optical sheet to a surface of a support plate via said ultraviolet-curing adhesive resin;
   fully curing said ultraviolet-curing adhesive resin by irradiating said ultraviolet-curing adhesive resin with ultraviolet rays that are stronger than the ultraviolet rays used in the causing step after said optical sheet was stuck on said surface of said support plate; and
   peeling said transfer film from said surface of said optical sheet, after said curing step.

5. The method for producing an optical holographic member as claimed in claim 4, further comprising a step of laminating a cover plate on said support plate such that said optical sheet is sandwiched between said support plate and said cover plate, after said peeling step.

6. The method for producing an optical holographic member as claimed in claim 5, wherein said laminating step includes a step of sticking under pressure said support plate and said cover plate together using a surface adhesive therebetween.

7. The method for producing an optical holographic member as claimed in claim 6, wherein said laminating step includes a step of conducting a hot pressure treatment for heating under pressure said optical sheet on said support plate, before said sticking step.

8. The method for producing an optical holographic member as claimed in claim 7, wherein said hot pressure treatment has the same temperature and pressure conditions as those of said sticking step.

9. The method for producing an optical holographic member as claimed in claim 7, wherein said hot pressure treatment is conducted at a pressure of 1.0 kg/cm$^2$ or higher and at a temperature of 80° C. or higher.

10. The method for producing an optical holographic member as claimed in claim 4, wherein said step of preparing said transfer film further comprises the step of forming a hydrophilic coat film on said transfer film; and whereby said holographic photosensitive film is formed onto said hydrophilic coat film.

11. The method for producing an optical holographic member as claimed in claim 10, wherein said holographic photosensitive film is formed by a holographic photosensitive agent dropped onto said hydrophilic coat film and a contact angle between said dropped holographic photosensitive agent and said hydrophilic coat film is between 16 degrees and 24 degrees.

12. The method for producing an optical holographic member as claimed in claim 11, further comprising a step of peeling said transfer film along with said hydrophilic coat film from said optical sheet, after said curing step.

13. The method for producing an optical holographic member as claimed in claim 10, wherein said hydrophilic coat film has a thickness between 50 Å and 900 Å.

14. The method for producing an optical holographic member as claimed in claim 4, wherein said preparing step includes the steps of:

forming a first moisture-proof layer on said transfer film forming said holographic photosensitive film on said first moisture-proof layer; and exposing and developing said holographic photosensitive film to make it into said optical sheet comprising a hologram having a holographic image.

15. The method for producing an optical holographic member as claimed in claim 14, wherein said step of preparing said optical sheet further includes a step of forming a second moisture-proof layer on said optical sheet.

16. The method for producing an optical holographic member as claimed in claim 14, wherein said first moisture-proof layer is made of a material selected from a group consisting of polyolefinic synthetic resins, acrylic synthetic resins, rubber resins, fluorine resins, epoxy resins and polyvinyl chloride synthetic resins.

17. The method for producing an optical holographic member as claimed in claim 16, wherein an optical rotation of said first moisture-proof layer is 37 degrees or less.

18. The method for producing an optical holographic member as claimed in claim 16, wherein an optical rotation of said first moisture-proof layer is 26 degrees or less.

19. The method for producing an optical holographic member as claimed in claim 14, further comprising a step of peeling said transfer film from said first moisture-proof layer, after said curing step.

20. The method for producing an optical holographic member as claimed in claim 19, further comprising a step of laminating a cover plate on said support plate such that said optical sheet coated with said first moisture-proof layer is sandwiched between said cover plate and said support plate, after said peeling step.

21. The method for producing an optical holographic member as claimed in claim 20, wherein said laminating step includes a step of sticking under pressure said support plate and said cover plate together using a surface adhesive therebetween.

22. The method for producing an optical holographic member as claimed in claim 4, wherein said holographic photosensitive film is formed by gelatin bichromate.

23. A method for producing an optical holographic member, comprising the steps of:

forming a hydrophilic coat film on a polymer film;

forming a holographic photosensitive film on said hydrophilic coat film;

exposing and developing said holographic photosensitive film to make it into a hologram having a holographic image;

coating an ultroviolet-curing adhesive resin on one of a surface of said hologram and a surface of a support plate on which said hologram is to be mounted;

causing a surface of said ultraviolet-curing adhesive resin to be sticky by irradiating said ultraviolet-curing adhesive resin with ultraviolet rays;

sticking said hologram onto said support plate using said ultraviolet-curing adhesive resin therebetween;

curing said ultraviolet-curing adhesive resin by irradiating said ultraviolet-curing adhesive resin with ultraviolet rays that are stronger than the ultraviolet rays used in the causing step, after said sticking step; and peeling said polymer film along with said hydrophilic coat film off from said hologram, after said curing step.

24. The method for producing an optical holographic member as claimed in claim 23, wherein said holographic photosensitive film is formed by dropping a holographic photosensitive agent onto said hydrophilic coat film and a contact angle between said dropped holographic photosensitive agent and said hydrophilic coat film is between 16 degrees and 24 degrees.

25. The method for producing an optical holographic member as claimed in claim 23, wherein said hydrophilic coat film has a thickness between 50 Å and 900 Å.

* * * * *